US011025569B2

(12) United States Patent
Lind et al.

(10) Patent No.: US 11,025,569 B2
(45) Date of Patent: Jun. 1, 2021

(54) SHARED CONTENT PRESENTATION WITH INTEGRATED MESSAGING

(71) Applicant: APPLE INC., Cupertino, CA (US)

(72) Inventors: Shaun C. Lind, San Francisco, CA (US); William Martin Bachman, San Jose, CA (US); Alexander C. D. Fringes, San Francisco, CA (US); Monika E. Gromek, Oakland, CA (US); Ofer Morag, Oakland, CA (US); Steve S. Gedikian, Redwood City, CA (US); Jeffrey L. Robbin, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 50 days.

(21) Appl. No.: 14/871,989

(22) Filed: Sep. 30, 2015

(65) Prior Publication Data

US 2017/0093769 A1   Mar. 30, 2017

(51) Int. Cl.
*G06F 3/048* (2013.01)
*H04L 12/58* (2006.01)
(Continued)

(52) U.S. Cl.
CPC ............ *H04L 51/10* (2013.01); *G06F 3/0481* (2013.01); *G06F 3/04842* (2013.01);
(Continued)

(58) Field of Classification Search
CPC ........... H04N 21/4788; H04N 21/4882; H04N 21/43079; H04N 21/632; H04N 21/4307; H04L 51/04; H04L 51/10; H04L 51/38; H04L 65/60; G06F 3/165; G06F 2203/04803; G06F 40/166; G06F 3/0481; G06F 3/04842; G06F 3/04886;
(Continued)

(56) References Cited

U.S. PATENT DOCUMENTS 6,230,172 B1   5/2001   Purnaveja et al.
8,990,303 B2   3/2015   Wong et al.
(Continued)

FOREIGN PATENT DOCUMENTS

FR   2988965 A1   10/2013
WO   2015073866 A1   5/2015

OTHER PUBLICATIONS

International Search Report and Written Opinion for PCT/US2016/049431 dated Nov. 23, 2016.
(Continued)

*Primary Examiner* — Alex Olshannikov
(74) *Attorney, Agent, or Firm* — Fernando & Partners, LLP

(57) ABSTRACT

Users who are experiencing a shared content stream can exchange messages. Each user device can present a graphical user interface that includes controls to interact with a shared content stream being received and presented at the user device; a control to begin composing a message to other users who are receiving the shared content stream, and a display area to display previously received messages associated with the shared content stream. A message can be associated with a shared content stream, e.g., by providing a tag that identifies the content being played at the time the message was sent.

20 Claims, 15 Drawing Sheets

(51) Int. Cl.
*H04N 21/4788* (2011.01)
*H04N 21/63* (2011.01)
*H04N 21/43* (2011.01)
*G06F 40/166* (2020.01)
*G06F 3/0481* (2013.01)
*G06F 3/0484* (2013.01)
*G06F 3/0488* (2013.01)
*G06F 3/14* (2006.01)
*G06F 3/16* (2006.01)
*G06Q 50/18* (2012.01)
*G06T 13/80* (2011.01)
*G09G 5/12* (2006.01)
*G09G 5/377* (2006.01)
*H04L 29/06* (2006.01)
*H04W 56/00* (2009.01)

(52) U.S. Cl.
CPC ........ *G06F 3/04886* (2013.01); *G06F 3/1454* (2013.01); *G06F 3/165* (2013.01); *G06F 40/166* (2020.01); *G06Q 50/184* (2013.01); *G06T 13/80* (2013.01); *G09G 5/12* (2013.01); *G09G 5/377* (2013.01); *H04L 51/38* (2013.01); *H04L 65/60* (2013.01); *H04N 21/4307* (2013.01); *H04N 21/4788* (2013.01); *H04N 21/632* (2013.01); *H04W 56/001* (2013.01); *G06F 2203/04803* (2013.01)

(58) Field of Classification Search
CPC ..... G06F 3/1454; G06Q 50/184; G06T 13/80; G09G 5/12; G09G 5/377; H04W 56/001
USPC .................................................. 715/716, 753
See application file for complete search history.

(56) References Cited

U.S. PATENT DOCUMENTS

| | | | |
|---|---|---|---|
| 9,264,501 B1* | 2/2016 | Story, Jr. | H04L 67/22 |
| 2003/0101450 A1* | 5/2003 | Davidsson | G06Q 10/10 |
| | | | 725/32 |
| 2008/0055269 A1* | 3/2008 | Lemay | G06F 3/0482 |
| | | | 345/173 |
| 2008/0209075 A1* | 8/2008 | Shamma | H04L 29/06 |
| | | | 709/248 |
| 2009/0154893 A1 | 6/2009 | Vasudevan et al. | |
| 2009/0271524 A1* | 10/2009 | Davi | H04N 21/234336 |
| | | | 709/231 |
| 2012/0110621 A1* | 5/2012 | Gossweiler, III | G06Q 50/01 |
| | | | 725/46 |
| 2013/0004138 A1* | 1/2013 | Kilar | H04N 21/4756 |
| | | | 386/230 |
| 2013/0055112 A1* | 2/2013 | Joseph | H04L 51/04 |
| | | | 715/758 |
| 2013/0275138 A1* | 10/2013 | Gruber | G10L 13/00 |
| | | | 704/260 |
| 2015/0277732 A1* | 10/2015 | Billgren | G06F 3/0488 |
| | | | 715/716 |
| 2016/0021047 A1* | 1/2016 | Sawato | H04W 4/12 |
| | | | 455/456.3 |

OTHER PUBLICATIONS

17 Mobile Apps to Help you Discover New Music, http://thenextweb.com/apps/2013/11/15/mobile-music/, printed Jan. 13, 2016, 6 pages, Nov. 15, 2013, 6.

* cited by examiner

1100

To: shaun@service.com ⌒1102

From: drew@service.com ⌒1104

Date: 2015-07-01 09:27UTC-8 ⌒1106

Body: This part coming up is my jim-jam. ⌒1108

Tag: <songID>"Everybody Out There"@02:12 ⌒1110

*FIG. 11*

SHARED CONTENT PRESENTATION WITH INTEGRATED MESSAGING

CROSS-REFERENCE TO RELATED APPLICATIONS

This application is related to the following concurrently filed U.S. patent application: Ser. No. 14/871,839, filed Sep. 30,2015, entitled "Earbud Sharing;" Ser. No. 14/871,842, filed Sep. 30, 2015, entitled "Music Everywhere;" Ser. No. 62/235,407, filed Sep. 30, 2015, entitled "Clock Synchronization Techniques Including Modification of Sample Rate Conversion;" and Ser. No. 14/871/879, filed Sep. 30, 2015, entitled "Synchronization of Media Rendering in Heterogeneous Networking Environments," which are each herein incorporated by reference in their entirety for all purposes.

BACKGROUND

This disclosure relates generally to sharing of content streams between or among multiple user devices and in particular to shared content presentations with integrated messaging capability.

People love to consume media. With the advance of technology, a great deal of media content (including songs, albums, videos, books, etc.) is now available in digital form. By interacting with online services, consumers can purchase digital media content items, typically in the form of computer-readable data files containing a representation of media content that the consumers' electronic devices can use to render tangible outputs such as images and/or sounds (referred to as playing the content). More recently, the advent of broadband Internet connectivity has led to the development of "streaming" media services that can provide media content items to users' devices on a temporary basis, often in real time (i.e., the rate of data delivery to the user's device can keep up with the rate at which the user's device renders tangible outputs from the data). In general, a "streamed" media content item either is not stored on the user device or is stored only briefly, e.g., in a buffer, to support rendering operations on the user's device. This can allow users to consume media content without being limited by the storage capacity of their devices, often at lower cost than purchasing content items. Some streaming media services may also allow users to temporarily download media content items for offline consumption and/or to purchase media content items for long-term storage on the users' devices.

SUMMARY

In addition to streaming media, users also love to share their experiences. For example, a user listening to streamed music may want her friends to hear it as well. If the users are not in the same place, they can use various shared streaming tools to stream the same content to multiple devices, including devices belonging to different users, so that all users can receive and experience the content at (approximately) the same time.

While experiencing shared content, the users may want to communicate with each other, e.g., about what they are experiencing. Certain embodiments of the present disclosure relate to devices, user interfaces, and methods that can facilitate communication among users who are experiencing a shared content stream.

Certain embodiments relate to graphical user interfaces for a user device. In some embodiments, a first portion of a graphical user interface (e.g., a region within a display area devoted to the graphical user interface) can provide various content controls the user can operate to interact with a shared content stream being received and presented at the user device, such as controls to play and pause the stream, to select content items to be streamed, and/or to invite other users to share the stream. A second portion of the graphical user interface (e.g., a second region within the display area devoted to the graphical user interface) can provide a message control the user can operate to compose and send a message to one or more other users who are also receiving the shared content stream. For example, the message control can include a text box, and a virtual keyboard can be presented when the user selects the text box. A third portion of the graphical user interface (e.g., a third region within the display area devoted to the graphical user interface) can provide a display of previous messages, including messages previously sent or received during presentation of the shared content stream. The displayed messages can be annotated with stream-relative timestamps identifying the particular content that was being played when a given message was sent.

Certain embodiments relate to methods for exchanging messages in association with a shared content stream. Such methods can use the graphical user interfaces described herein or other suitable interfaces. For example, a first user device can receive a shared content stream that is shared with one or more other user devices. The first user device can present the shared content stream to the user. In some instances, a graphical user interface can be displayed while the content is presented. This interface can include information from the shared content stream (e.g., information identifying the content being played, a visual component of the content if applicable) and a message control that the user can operate to compose and send a message to users of the one or more other devices with which the stream is shared. Via the user interface, the first user device can receive user input that includes a new message to be sent. The first user device can determine a stream-relative timestamp for the message, where the stream-relative timestamp identifies a portion of the stream that was being presented when the user input was received, and can add the stream-relative timestamp to the message, e.g., as a tag. The first device can send the message to the users of the one or more other devices. If the first user device receives a message that includes a stream-relative timestamp, the first user device can present the message within the graphical user interface that is presenting the information from the shared content stream.

The following detailed description together with the accompanying drawings will provide a better understanding of the nature and advantages of the present disclosure.

BRIEF DESCRIPTION OF THE DRAWINGS

FIG. 11 shows an example of a stream-associated message according to an embodiment of the present disclosure.

DETAILED DESCRIPTION

Certain embodiments of the present disclosure relate to devices, user interfaces, and methods to integrate messages sent and received via a user-to-user messaging service (e.g., SMS/MMS services, or the iMessage® service offered by Apple Inc.) with presentation of a content stream, allowing users who are experiencing a shared content stream to exchange messages without leaving the app that is presenting the shared content stream. Examples are described with reference to streaming of music and other media content in operating environments where users can select existing content items to be streamed and can control the stream itself with trick play commands (e.g., pause and resume playback, fast forward, rewind, etc.) but generally do not modify the underlying content item or propagate any modifications to other devices; streaming as used herein can be understood as a one-way data transfer that can be directed by the user(s). However, those skilled in the art will appreciate that the techniques described herein can also be adapted for application in contexts that do involve two-way data transfer, such as collaborative editing of a document or other content item.

System Overview

Figure 1:
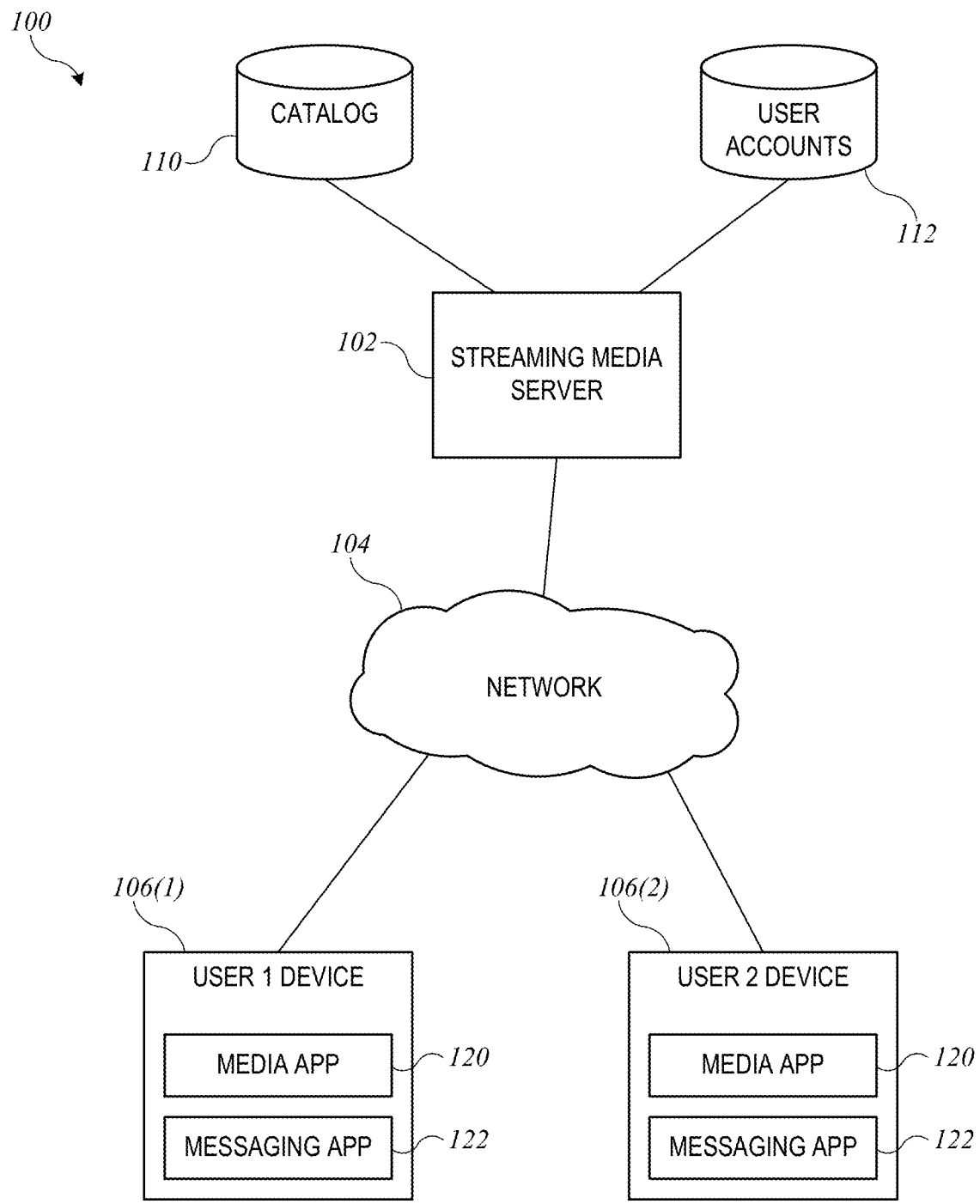
FIG. 1 shows an example of a media delivery system according to an embodiment of the present disclosure.

FIG. 1 shows an example of a media delivery system 100 according to an embodiment of the present disclosure. Media delivery system 100 can include a streaming media server 102 communicably connected to a network 104 (e.g., the Internet). User devices 106 can also connect to network 104 and can connect to server 102 via network 104.

Streaming media server 102 can be implemented as a computer system or an interconnected set of computer systems (e.g., a server farm or multiple server farms, elements of which can be geographically dispersed as desired). Streaming media server 102 can have access to a catalog repository 110, which can store media content items that can be streamed or otherwise delivered to user devices 106. Catalog repository 110 can be implemented using large-scale data storage and retrieval technologies and can include a collection of media content items (which can be stored as computer-readable data files containing a representation of media content) as well as an index to the collection. The index can be, e.g., a database or other structured data store that associates various items of metadata descriptive of each media content item (which can include any data descriptive of the content item or some aspect thereof) with a reference to the location where the content item is stored. The index can be used to facilitate searching and browsing of media content items stored in catalog repository 110. For example, metadata for a media content item can include a track title (e.g., song title, book title, video title), artist information (e.g., name of a band or individual performer that created the content item), album information (e.g., if the media content item is part of an album), track information (e.g., if the media content item incorporates a collection of related content items, sometimes referred to as "tracks," such as the individual songs on an album), date of creation of the content, genre information, and so on. A particular storage configuration or indexing scheme is not required.

Streaming media server 104 can also have access to a user account information repository 112, which can store information about user accounts for the streaming media service. User account information repository 112 can be implemented using large-scale data storage and retrieval technologies and can include, e.g., a database of user account records pertaining to accounts established by users with the streaming media service. For example, a user operating user device 106(1) (or user device 106(2)) can communicate with streaming media server 102 to establish an account. Establishing an account can include defining a username (or "user ID") and password that can be used to identify and authenticate a particular user. Additional user account information can be collected, e.g., by express user input or automatically based on interactions between user device 106(1) and streaming media server 102. Examples of user account information can include subscription and payment information (e.g., whether the user is a subscriber and whether applicable subscription fees have been paid), contact information (e.g., email address, phone number, mailing address), demographic information (e.g., age, gender, location, etc.), media consumption history, and so on.

User devices 106 can belong to users of a streaming media service operating through streaming media server 102. Different instances of user device 106 can belong to different users, and in some instances a single user can have multiple devices 106. User devices 106 can include various general-purpose user-operable computing devices, such as a smart phone, a tablet computer, a desktop or laptop computer, a wearable computing device, or the like. In some embodiments, the provider of a streaming media service can provide a media application program 120 (also referred to as a "media app") that, when executed on user device 106, enables user device 106 to interact with streaming media server 102 to browse catalog repository 110, search catalog repository 110, and stream selected media content items from catalog repository 110 to user device 106. Accordingly, media app 120 can provide user account credentials (e.g., username and password) to streaming media server 102, allowing streaming media server 102 to retrieve user account information from user account information storage 112 and to customize the experience for a particular user. It is to be understood that a user can access the same user account on streaming media server 102 using different user devices 106.

User devices 106 can also store and execute other application programs, such as messaging app 122. Messaging app 122 can include any software that is operable to send and receive messages from and to the user, using one or more message communication protocols. For example, the Messages app provided by Apple Inc. as part of the iOS operating system for mobile devices supports sending and receiving of messages using protocols such as SMS/MMS (Short Messaging Service and Media Messaging Service, both of which can be transmitted using cellular data networks) as well as Apple's own iMessage® service, a proprietary service that uses the Internet for message transmission. Specific apps and supported messaging services are referenced herein as examples; other apps and messaging services can also be used. In embodiments described herein, messaging app 122 can interact with media app 120 to provide user-to-user messaging services that can be integrated with streaming media experiences delivered via media app 120. Examples of such operations are described below.

Depending on implementation, streaming media server 102 can provide a variety of experiences to user device 106 executing media app 120. For example, media app 120 can present a graphical user interface ("GUI") that allows a user to search or browse the media content stored in catalog 110. In response to user input received via the GUI, media app 120 can send requests for information to server 102 (e.g., a request to view content by a particular artist, a request to search for content items meeting specific criteria, etc.). Server 102 can respond by providing "page data," which can include instructions and/or information items usable by media app 120 to render another GUI image responsive to the request. In some embodiments, the page data can include image content, text elements, references to locations where various elements (e.g., images or icons) used to render a page can be retrieved, hyperlinks or other references to data storage locations (e.g., locations in catalog repository 110) that can be accessed (or not) based on further user input, and so on. Further, a page (or GUI image) rendered by media app 120 can include user-operable controls to request or control playing of media content items. Accordingly, user devices 106 can each be used to locate and stream media content items via streaming media server 102.

In operation, user device 106 can execute media app 120. Responsive to user input, user device 106 can communicate with streaming media server 102 to identify content to be streamed to user device 106 and to initiate and control streaming of such content. For example, the user can select and play specific content items (e.g., a track or an album). A user can also share a content stream with one or more other users.

In embodiments described herein, one user device (e.g., user device 106(1)) can also instruct streaming media server 102 to "share" a content stream with one or more other user devices (e.g., user device 106(2)), which can belong to the same user or a different user. Sharing a content stream, as used herein, refers generally to any process by which the same content is delivered from a source (e.g., streaming media server 102) to two or more destination devices (e.g., user devices 106(1) and 106(2)) such that all destination devices can present the content at approximately the same time (subject to differences in transmission time to different destination devices, variations in processing latency between destination devices, and the like). Existing or other techniques for synchronizing content delivery to multiple destination devices can be used in connection with shared content streams. In some embodiments, one of the destination devices can be the "initiator" of content-stream sharing. For instance, a first user can operate user device 106(1) to identify content to be streamed and one or more other user devices (e.g., user device 106(2)) to be invited to share the streamed content. Other user device 106(2) can receive an invitation and can accept or reject the invitation (e.g., based on user input as described below). While a shared content stream is in progress, initiator device 106(1) can provide user-operable control elements that allow the user to control playback of the content stream, which can include, e.g., pausing and resuming playback, skipping ahead to a next track, and/or modifying a queue of upcoming tracks to be played (e.g., adding, removing, or rearranging the tracks in the queue). In some embodiments, some or all of the non-initiator user devices (e.g., user device 106(2)) can also be permitted to share control of playback. Those skilled in the art with access to the present disclosure will understand that a specific technology for shared content streaming is not required.

Depending on implementation, streaming media server 102 may also support other streaming services. For example, the operator of streaming media server 102 may allow certain individuals to act as "curators" who can define playlists of media content items; other users can select a playlist and receive the content items contained therein. As another example, streaming media server 102 can support "radio" stations, which can be ongoing streams of media content that a user can select to experience at any time. In various embodiments, radio stations can include "live" streams (e.g., a digitized version of a terrestrial radio broadcast, other live streaming content including content produced exclusively for the streaming media service) and/or algorithmically-generated (and therefore potentially endless) playlists of content items selected by a computer algorithm according to some criterion (e.g., genre, time period, or similarity to a specific "seed" artist selected by a user).

In addition, in some embodiments, streaming media server 102 can provide ancillary services. For instance, a user may be able to bookmark media content items from the catalog. As used herein, "bookmarking" refers generally to a process by which the user provides input indicating that he or she wants to remember a particular content item or make it easy to find again, e.g., through a list of bookmarked items. In some embodiments, when the user bookmarks a media content item, a data record identifying the content item can be added to the user's account information in user account information repository 112. Media app 120 can provide a control operable by the user to access a list of bookmarked content items.

Another ancillary service can be downloading content items for offline listening. In general, it is assumed that streamed content items are not persistently stored on user device 106 (although they may be temporarily stored or buffered in connection with playing of the content). Downloading can allow a content item to be stored for a longer period and to be accessed in situations where user device 106 might not be able to communicate with streaming media server 102 (e.g., when the user is in an airplane or in an area that lacks connectivity to network 104). In various embodiments, downloaded content may be automatically deleted after a specific time (e.g., 24 hours, 48 hours); a user may also be limited as to the number of content items that can be downloaded at any given time and/or how many times a particular downloaded content item can be played.

Another ancillary service can be purchasing content items. When a content item is purchased, user device 106 can indefinitely store a copy of the content item, e.g., in a local or personal media library. Purchased content items can be played by user device 106 without restriction.

Another ancillary service can be a social posting service, in which certain users (e.g., artists or other curators) can create posts that can be made visible to other users through a dedicated social feed, on a catalog page associated with a particular artist, while content by a particular artist is being played, and so on. Users can interact with posts, e.g., by commenting on the posts, rating the posts, and/or sharing the posts on various social media services (including services that operate independently of the streaming media service).

In some embodiments, streaming media server 102 can restrict access to some or all of its services to users who have paid an access fee (referred to herein as "subscribers"). For example, users who are not subscribers might be permitted to purchase content items but not to bookmark or download content items, and streaming access by non-subscribers can be limited (e.g., a non-subscriber may be permitted to stream only a limited number of content items per month or to stream only a preview portion of any given content item). Additional or different restrictions can also be applied. In some embodiments, access to shared content streaming and associated messaging operations as described below can be limited to subscribers.

It will be appreciated that system 100 is illustrative and that variations and modifications are possible. Any number of user accounts and user devices can be supported. Media content items can include any type of media content (including music, spoken-word, books, video, images, etc.).

In embodiments described herein, media app 120 can support integration of user-to-user messaging capability with shared content streaming capability. For example, media app 120 can present a user interface that allows a user to compose and send a message to other users who are receiving the shared content stream and to view received messages from other users who are receiving the shared content stream, all without leaving the context of media app 120. Further, in some embodiments, after a shared content stream has ended at the user device (or in the middle of playing the shared content), a user can view messages associated with the shared content stream and can replay all or part of the stream, including any message exchanges that occurred. In some embodiments, media app 120 can leverage the messaging capability provided through messaging app 122, thereby allowing the user to enjoy user-to-user messaging in association with shared content, but without requiring server 102 to implement a user-to-user message communication protocol. However, in some embodiments, the media app 120 and the server 102 may utilize user-to-user message communication protocols to facilitate the messaging without requiring the need for the messaging app 122.

FIGS. 2-10 show graphical user interface (GUI) images that can be used for integrating messaging capability with shared content streaming according to an embodiment of the present disclosure. For purposes of description, all graphical user interface images (also referred to as "pages" or "screens") shown herein are assumed to be presented on a touchscreen display, which allows the user to interact with user-operable control elements by tapping on appropriate areas of the display or performing other touch gestures such as swiping to scroll or the like. Other user interfaces can be substituted, such as "point and click" interfaces where the user operates a pointing device to position a cursor and then clicks a button or makes a specific gesture to indicate a selection. The interface images can be adapted for a particular device, e.g., depending on the size and aspect ratio of the display and/or the available user input devices, and an interface image may occupy all or part of the physical display area of a particular device.

Figure 2:
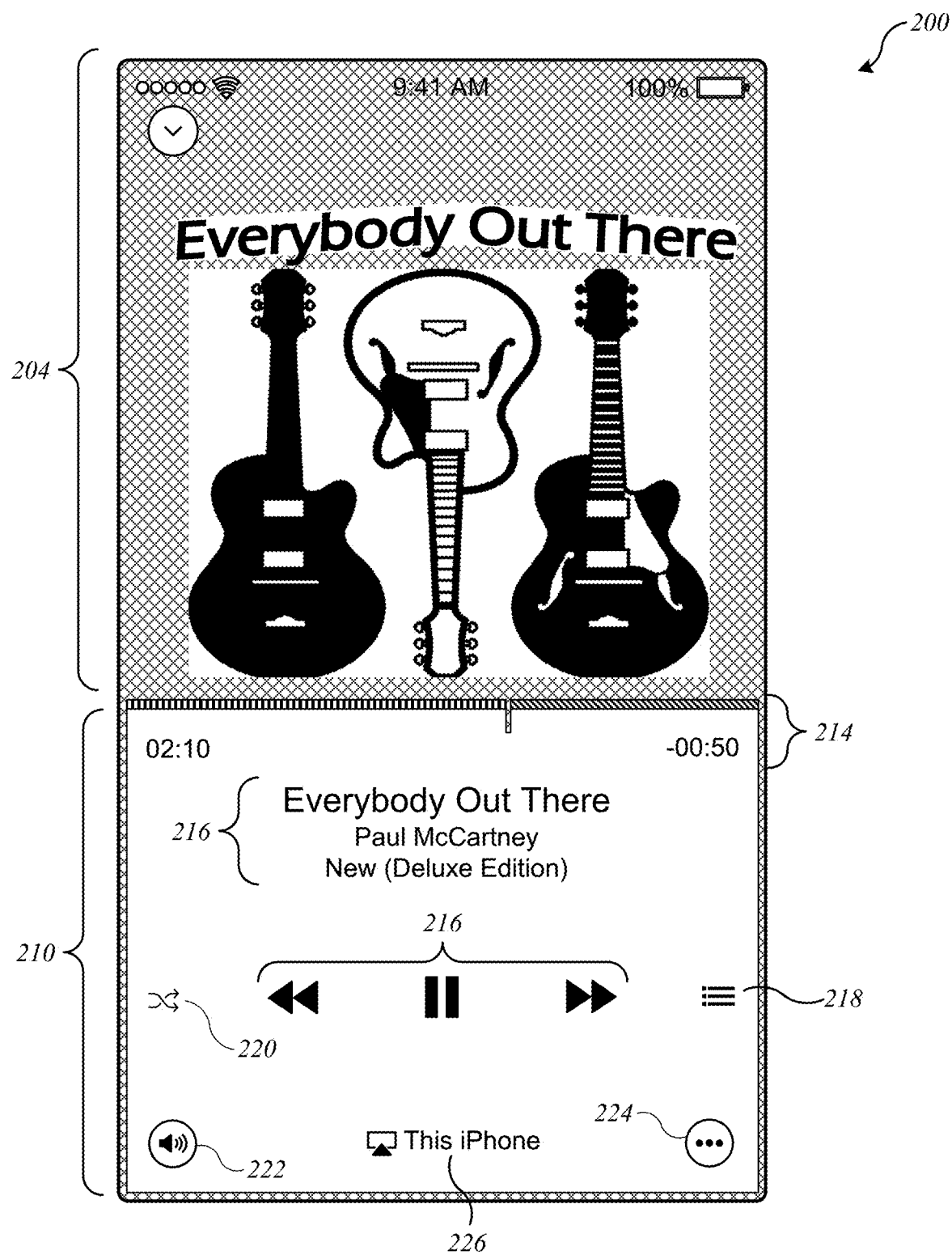
FIG. 2 shows a "now playing" screen according to an embodiment of the present disclosure.

FIG. 2 shows a "now playing" screen 200 according to an embodiment of the present disclosure. Screen 200 can be used to initiate sharing of a content stream. In some embodiments, screen 200 can be presented on a user device (e.g., user device 106(1) of FIG. 1) while the user is receiving streamed content via streaming media server 102. Screen 200 can include image area 204 to display an image (e.g., album artwork) associated with the content item being streamed and control area 210 that can include various user-operable controls to allow the user to interact with the streamed content. For example, control area 210 can include content identifier 212, which in some embodiments can be a selectable control element that allows the user to view additional information about the content item (also referred to as a "track") currently being presented (or played). Progress bar 214 can indicate the current playback position within the track, which can be a time relative to the beginning or end of the track. Playback controls 216 can include controls for pausing and resuming playback, fast forwarding (to a next track or to a later point in the same track), and rewinding (to an earlier point in the same track or to a previous track). List control 218 can allow the user to view and/or modify a list of tracks that are queued for playback. Shuffle control 220 can allow the user to randomly rearrange the tracks in the queue and/or to define options for repeated playing of tracks. Volume control 222 can be selected to allow the user to make volume adjustments, and "more" control 224 can be selected to access additional options (e.g., downloading, purchasing, or bookmarking the track, and so on).

Figure 3:
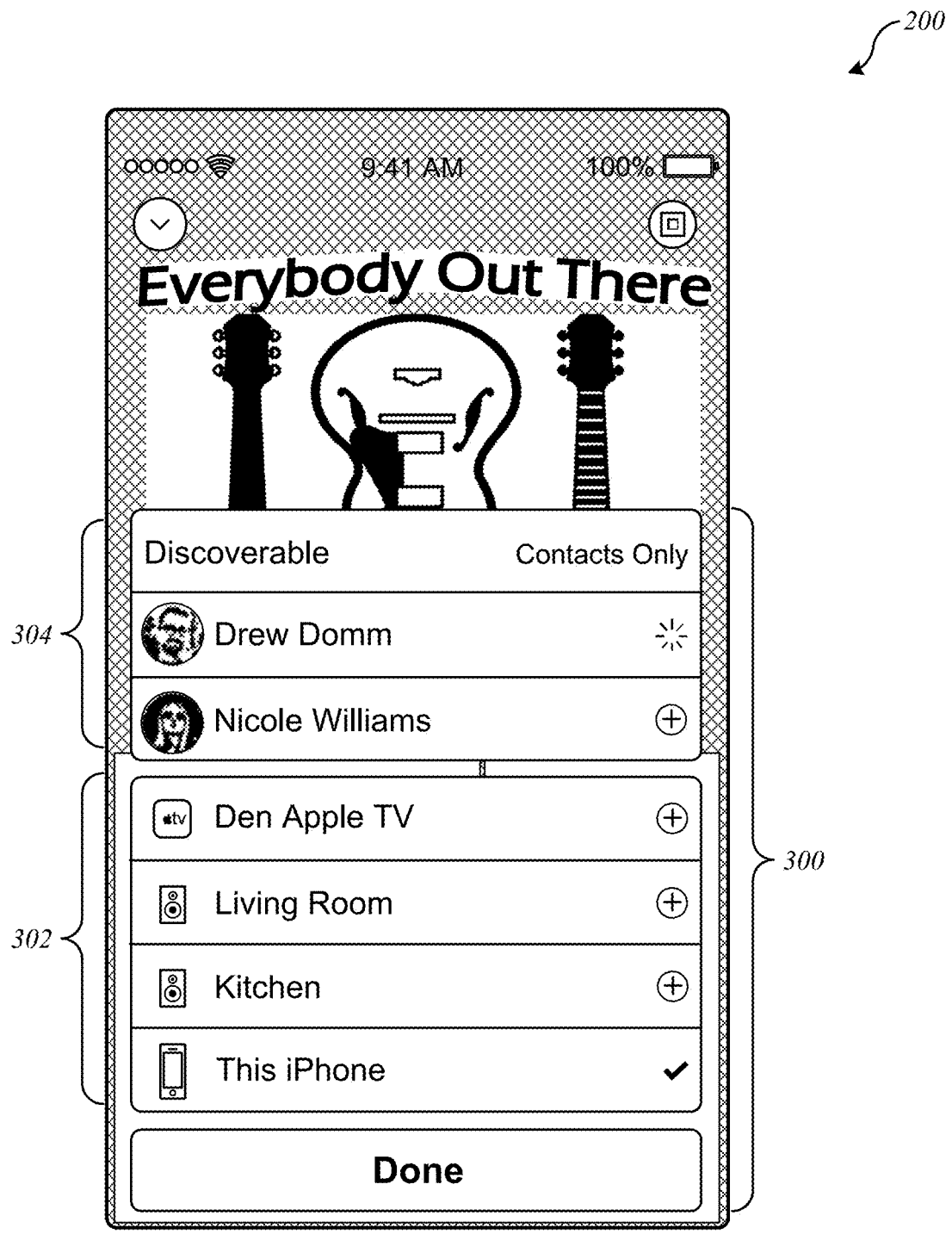
FIG. 3 shows an overlay menu to initiate sharing of a content stream according to an embodiment of the present disclosure.

In some embodiments, now playing screen 200 can provide a sharing control 226. Sharing control 226 can be operated by a user to initiate sharing of the content stream with one or more other users. FIG. 3 shows an overlay menu 300 that can appear over screen 200 when the user operates sharing control 226 (e.g., by tapping on it) according to an embodiment of the present disclosure. Menu 300 includes a list of destination devices with which the streamed content can be shared. Devices in section 302 can include other devices belonging to (or controlled by) the same user whose device 106(1) is displaying menu 300, such as speaker systems or the like, to which the user may choose to direct streamed audio (or video if applicable).

Sharing section 304 can display a list of other users who have devices available for sharing the content stream. For example, the listed users can include contacts of the "inviting" user whose device is displaying menu 300, e.g., as determined from a contacts list accessible to user device 106(1)). In some embodiments, the list can be filtered based on which of the user's contacts are subscribers to the streaming media service that is providing the content stream. As another example, the list can include users of streaming media server 102 who have indicated interest in receiving shared content streams (from the inviting user specifically, or more generally), or the like. In some embodiments, the list presented in sharing section 304 can be further filtered based on which of the possible sharing users have a device to which user device 106(1) or streaming media server 102 can currently connect. In this example, two other users have been identified. The inviting user can select one or more other users to share the content stream, e.g., by tapping on the user's name in menu 300. Any number of users can be invited to share a content stream; if desired (e.g., for resource management purposes), the number can be limited by user device 106(1) or server 102.

When an inviting user, operating user device 106(1), selects a second user to share a content stream, user device 106(1) can send an invitation to a user device belonging to the second user (e.g., user device 106(2)), inviting the second user to join. The invitation can include, e.g., an identifier of the first user, information about the content to be shared (e.g., an identifier of the currently playing track, album, playlist or the like), identifiers of any other users who have been invited to share, or who are currently sharing the stream, any information needed by user device 106(2) to start receiving the shared content stream, and so on. User device 106(1) can send the invitation to user device 106(2) via streaming media server 102, via a local area network connection (if both devices are present and visible on the same local area network), or via any other available communication channel.

Figure 4:
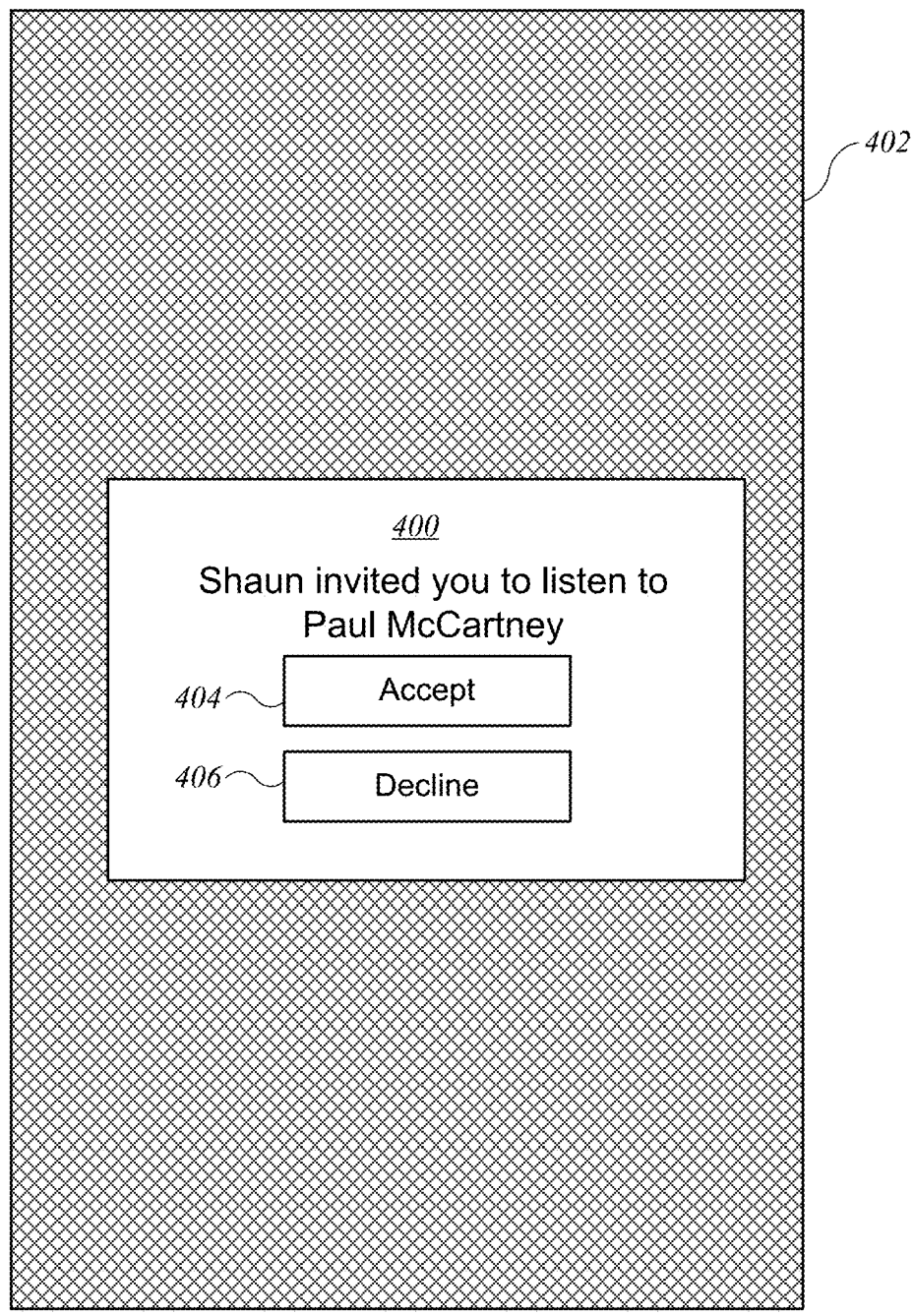
FIG. 4 shows an alert that can be displayed on a user device according to an embodiment of the present disclosure.

When user device 106(2) receives an invitation, user device 106(2) can determine whether to accept. For instance, user device 106(2) can alert the second user to the invitation and prompt the user to accept or decline. FIG. 4 shows an alert 400 that can be displayed by user device 106(2) according to an embodiment of the present disclosure. Alert 400 can appear, e.g., as a pop-up or overlay over other information currently being displayed on display 402 of user device 106(2). Alert 400 can identify the inviting user and the nature of the invitation and can provide user-operable controls to accept (button 404) or decline (button 406) the invitation. If the user accepts, user device 106(2) can notify user device 106(1), via any available communication channel, including via streaming media server 102. In some embodiments, the invitation can include the information needed for user device 106(2) to join the shared content stream and start receiving the shared content. User device 106(2) can communicate with user device 106(1) and/or streaming media server 102 to establish a channel for delivery of streamed content. Thus, user device 106(1) and 106(2) can each receive a shared content stream; any technology for streaming the same content to multiple devices can be used in connection with embodiments described herein.

Figure 5:
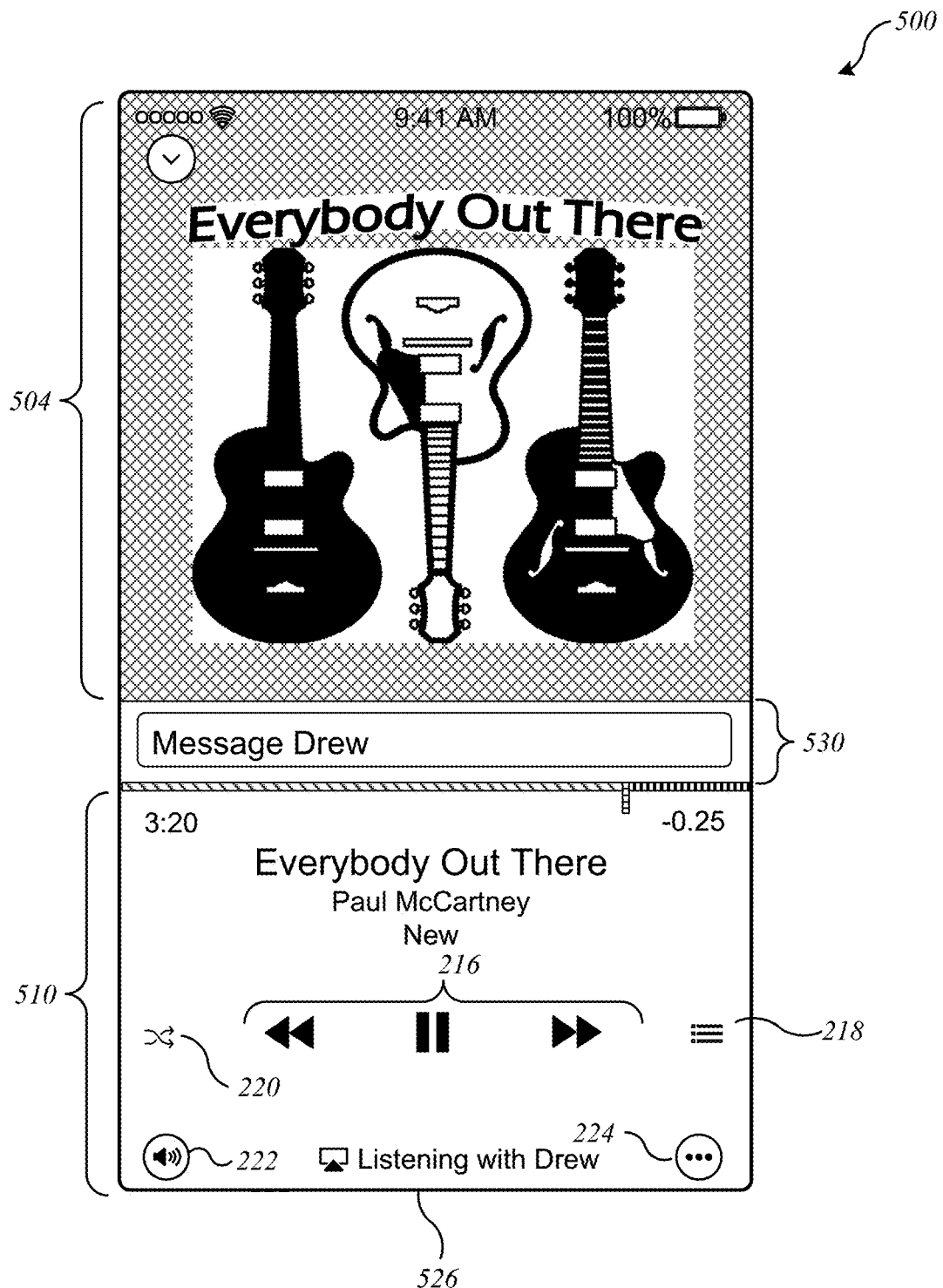
FIG. 5 shows a now playing screen that can be presented on a user device while receiving a shared content stream according to an embodiment of the present disclosure.

FIG. 5 shows a now playing screen 500 that can be presented on a user device while receiving a shared content stream according to an embodiment of the present disclosure. It is to be understood that screen 500 can be presented on an initiating user device (e.g., user device 106(1)) and separately on each other user device that is also receiving the content stream (e.g., user device 106(2)), with appropriate user-specific modifications. (For instance, user Drew's screen would not say "Listening with Drew" but would instead identify the other user.) Screen 500 can be generally similar to screen 200 described above, including both image area 504 and control area 510. In this case, the various control elements in control area 510 can be provided to the extent that they are operable by a particular user. For instance, in some embodiments only the user who initiated sharing has the ability to control the stream, and control elements 216, 218, 220 can be rendered in an "inactive" format (e.g., in a low-contrast color scheme, greyed out, etc.) or not rendered at all for users who do not have the ability to control the stream.

Sharing control 226 can be presented, e.g., as shown, to identify the other user(s) sharing the content stream. In some embodiments, only the user who initiated the sharing of the content stream can change the sharing settings, e.g., inviting other users, and sharing control 226 can be rendered to indicate that it is inoperative on the screen of any device that is not currently permitted to change the sharing settings. Presentation of an inoperative sharing control 226 can provide a useful indicator that the content stream is being shared (and with whom), and in some embodiments, any user who is sharing a content stream can operate control 226 to stop receiving the shared stream even if the user is not authorized to invite users. For example, one user can stop sharing while any other users continue to share. Other implementations of a sharing control can be used.

Now playing screen 500 can also integrate messaging between (or among) the users who are receiving the shared content stream. For example, screen 500 can include message box 530, which can be used to create a message to the other user(s) who are receiving the shared content stream. A user can initiate creation of a message, e.g., by tapping on message box 530.

Figure 6:
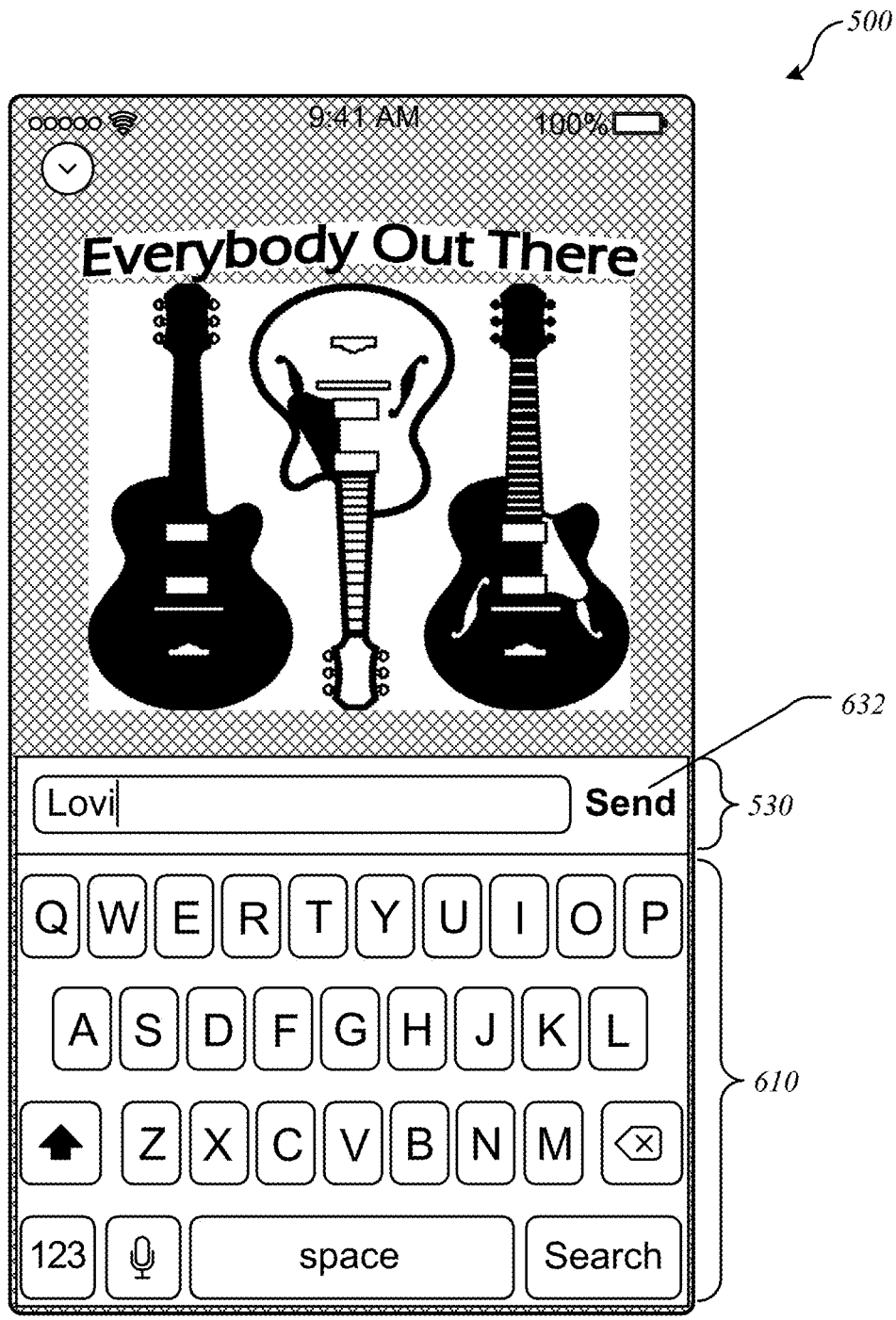
FIG. 6 shows an example of a now playing screen while a user is composing a message according to an embodiment of the present disclosure.

FIG. 6 shows an example of now playing screen 500 while a user is composing a message according to an embodiment of the present disclosure. Virtual keyboard 610 can be provided in place of control area 510. Message box 530 can show text characters typed by the user, and Send control 632 can be provided to allow the user to send the message. In some embodiments, any message sent using message box 530 and send control 632 is sent to all users who are sharing the content stream, and there is no need for the sending user to specify the message recipient(s). Any user sharing the stream can send a message to the other users sharing the stream in like manner.

Figure 7:
FIG. 7 shows an example of a now playing screen after some messages have been sent and received according to an embodiment of the present disclosure

Messages exchanged among the users, e.g., using the message composition interface of FIG. 6, can be presented in image area 504 (see FIG. 5) of now playing screen 500. FIG. 7 shows an example of now playing screen 500 after some messages have been sent and received according to an embodiment of the present disclosure. In this example, messages are displayed in image area 204 (similar to image area 504 of FIG. 5), overlaying the image. A "conversation" view is shown, in which each message is represented as a dialog bubble (dialog balloon), with the user's sent messages (e.g., dialog bubble 702) aligned to the right and messages received from other users (e.g., dialog bubble 704) aligned to the left. As shown, an attribution line 706 can be included with the dialog bubble for a received message, to indicate which user sent a particular message. While dialog bubbles are illustrated on the right and left, respectively, they may instead be presented on the top and bottom, respectively, of image area 204 instead.

Each dialog bubble 702, 704 can also include a stream-relative timestamp 712, 714. A stream-relative timestamp can include any information that identifies the particular content item and a specific portion thereof that was playing when the message was sent. For instance, a stream-relative timestamp can include a track identifier and the playback position (e.g., time) within the track corresponding to what was being played and the time within the track when a particular message was sent. As described below, the stream-relative timestamp can be attached as a tag to the message by the user device that sends it, and other user devices can use the information from the tag to render the message.

As messages are sent and received, each message can appear at the bottom of image area 204 and earlier messages can be moved up to create space, so that the conversation between (or among) the participating users can be read chronologically from the top down. The message bubbles may traverse along a path, overlaid upon image area 204 of now playing screen 500 (e.g., across or over the album art that corresponds to the content stream being played). As new messages come in, older messages can scroll up to and/or out of view at the top of image area 204. In some examples, the messages may traverse a path (e.g., a directional path) from top to bottom, bottom to top, left to right, right to left, etc. The directional path may be linear, curved, circular, random, directed based on musical patterns within the streaming content, etc. In some embodiments, it is possible to scroll the display (e.g., within image area 204) and view the older messages; an example is shown below. In this example, the image associated with the currently playing content item (e.g., album artwork) can remain as a static background image, and the dialog bubbles can move over it. While examples are provided herein with reference to dialog bubbles floating upwards, it should be understood that this is just one example of many, and the dialog bubbles may float in any direction as described above.

Other information can also be included in the conversation view. For example, track marker 720 can be inserted into the conversation to mark the beginning of a new track in the content stream. In this example, track marker 720 includes the track name, artist name, and an absolute time reference (e.g., the actual date and/or time when the track began to be streamed to the users). In some embodiments, track marker 720 can be generated as a message by music app 120 and can be presented as such. For instance, it need not be attributed to a user and can be presented in a different format, e.g., as a free-floating line of text rather than a dialog bubble. Track marker 720 can move up with the messages so that any user reviewing the conversation can determine the point at which various tracks began playing.

In some embodiments, dialog bubble 704 for the most recent message can remain at the bottom of image area 204 until a subsequent message (or track marker) displaces it upward. In other embodiments, the dialog bubbles can be animated such that each dialog bubble slowly floats upward (e.g., at a constant speed) through image area 204 before eventually disappearing at the top; all bubbles can float upward at the same rate. Thus, there may be gaps (spacing) between dialog bubbles that can be inconsistent between dialog bubbles, e.g., as shown in FIG. 7, and if no messages are received for a sufficiently long period, image area 204 may not show any dialog bubbles at all. This can provide a visual timescale for the messages and can provide the user a sense of time passing. Track marker 720 can appear at the bottom of image area 204 and float upward along with the dialog bubbles.

In some embodiments that use time-animated dialog bubbles (e.g., where the animation and/or spacing of dialog bubbles indicates the corresponding time with the content and/or relative time between dialog bubbles), if a user starts composing a message, the animation can be temporarily frozen, and any gaps (vertical or otherwise) between dialog bubbles (or between a dialog bubble and a track marker) can be "collapsed" (e.g., reduced to some small distance) and/or consistent with respect to each other to allow the user to see more of the conversation on screen while composing a message. If a message is received while the user is composing a message, a dialog bubble for the received message can push up the older dialog bubbles and thereafter remain at the bottom of image area 204 while the user continues to type. Once the user sends the message, the animated behavior can resume, with the dialog bubbles all floating upward at the same rate or at an accelerated rate to catch back up to an expected position (e.g., the position they were in prior to composition of the new message or the position they would have been in had no new message been composed); any gaps that were collapsed while the user was composing the message can be, but need not be, restored.

In some embodiments, the content stream can include multiple tracks (e.g., songs or other individual content items or defined segments). Each track may be associated with a different image to be presented in image area 204. When a transition from one track to another occurs, a new track marker (similar to track marker 720) can be generated and inserted into the conversation view, and the background image can be changed to a new image associated with the new track. If time-animated dialog bubbles are being used, the track marker and any dialog bubbles currently on the screen can continue to float upward. As another option, when a track change occurs, all dialog bubbles may be hidden (removed from the screen) to allow the user to see the image for the new track.

Figure 8:
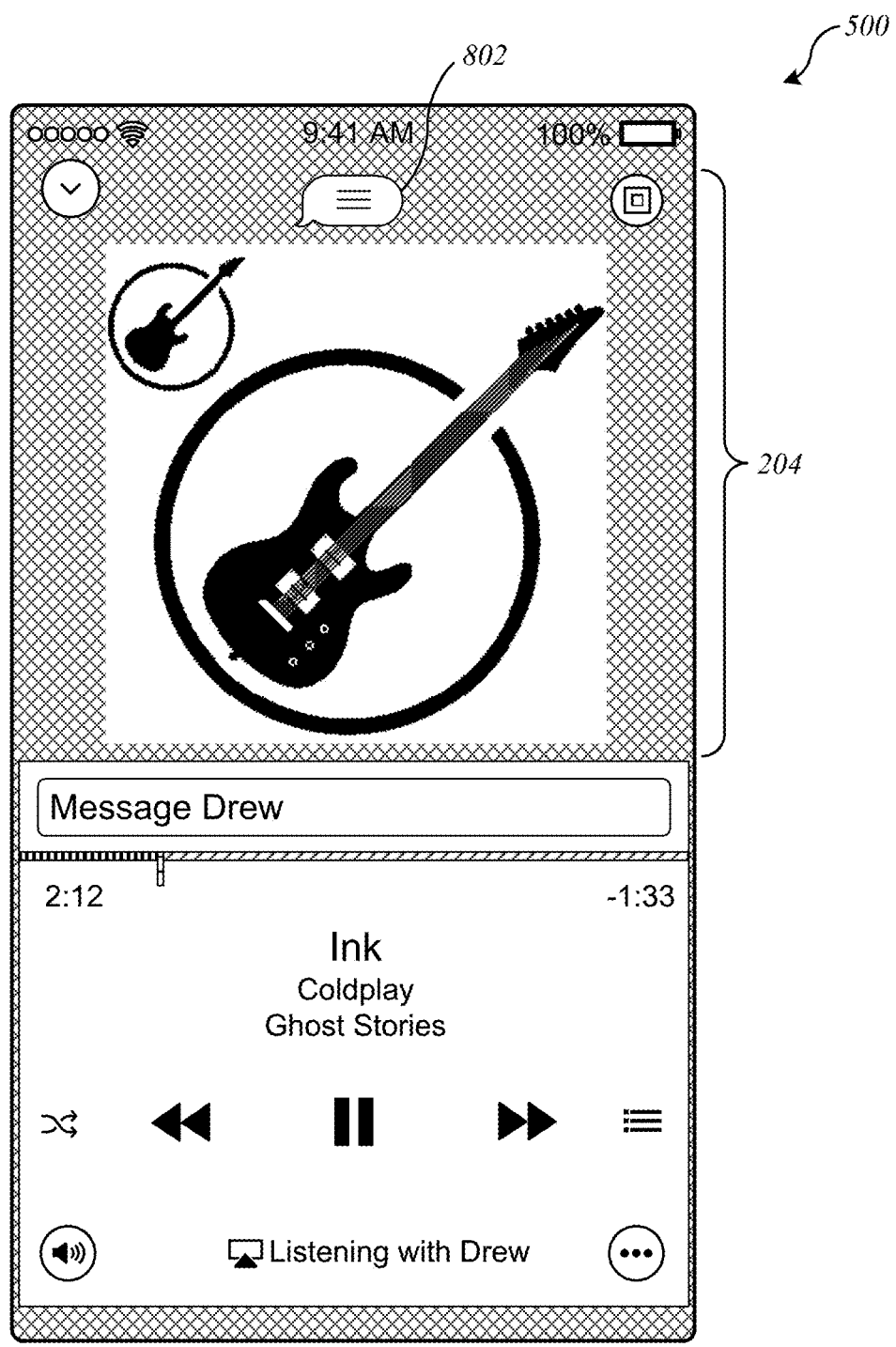
FIG. 8 shows an example of a now playing screen after a transition to a next track, according to an embodiment of the present disclosure.

As a result of these or other events, a shared content stream can have associated messages without any of the messages being visible on the now playing screen. FIG. 8 shows an example of now playing screen 500 after a transition to a next track, according to an embodiment of the present disclosure. Image area 204 shows a different image (e.g., album artwork) associated with the new track but is otherwise empty. For instance, the most recent dialog bubbles may have floated out of view as described above, or the occurrence of a track change may trigger hiding all the dialog bubbles. Conversation icon 802 can appear at the top of image area 204 to indicate that older messages exist, and a user can view the older messages, e.g., by tapping icon 802 or dragging it downward. Messages can appear as dialog bubbles in the same chronological order in which they were previously displayed (either evenly or consistently spaced, or spaced based on their respective timestamp or receipt time within the track that was playing when the message was received).

Figure 9:
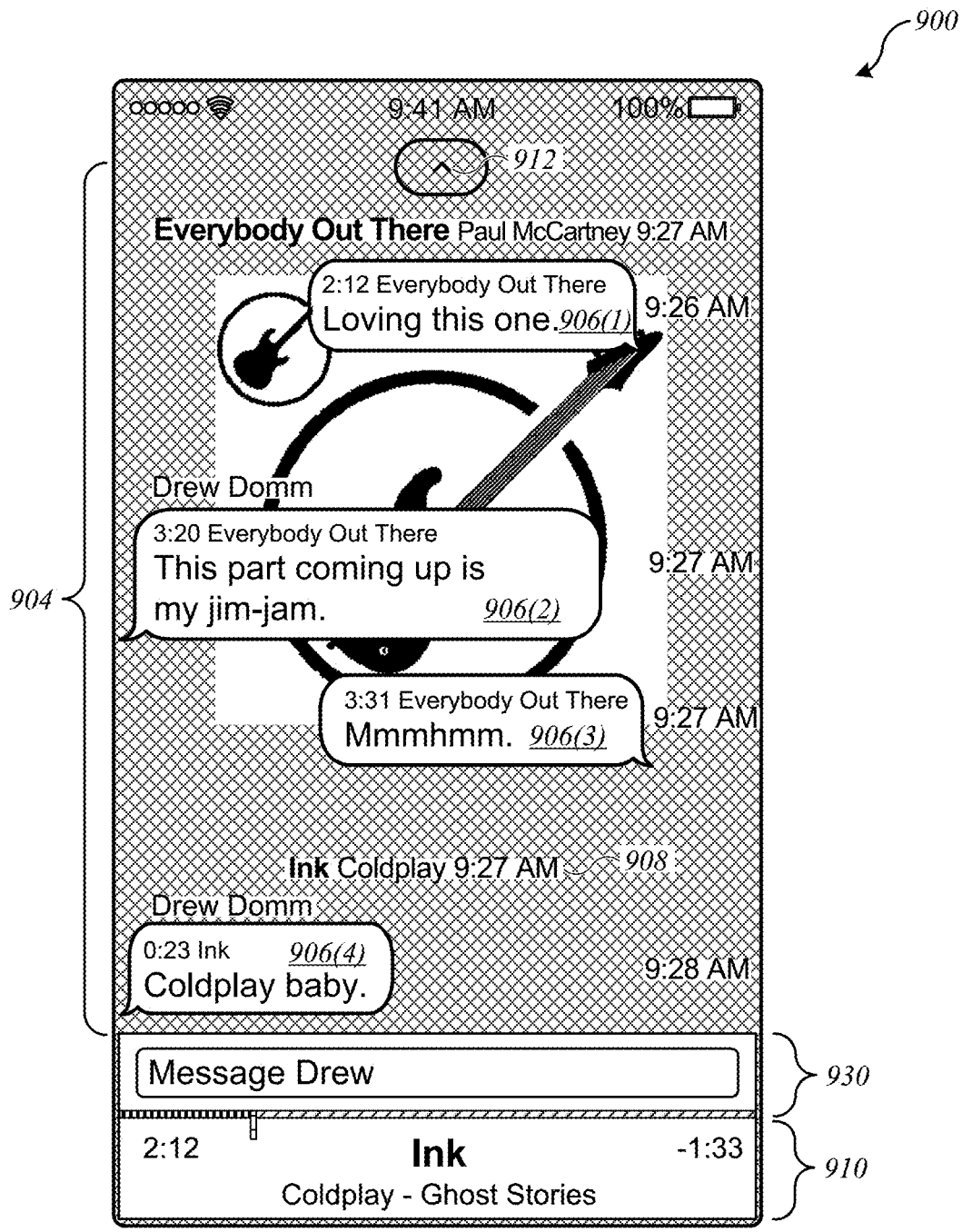
FIG. 9 shows an example of a now playing screen with an expanded message display area according to an embodiment of the present disclosure.

Some embodiments can offer the option to expand the portion of the screen dedicated to showing messages. For example, a user may be able to drag icon 802 downward or to drag down within image area 204 to expand the message display area. FIG. 9 shows an example of a now playing screen 900 with an expanded message display area 904 according to an embodiment of the present disclosure. Message display area 904 can be similar to image area 204 but larger; in this example, message display area 904 occupies most of screen 900. Like image area 204, message display area 904 can show the conversation history using dialog bubbles 906, which can be similar to dialog bubbles 702, 704 described above, and track marker 908, which can be similar to track marker 720 described above. As with other conversation views described herein, dialog bubbles 906 and track marker 908 can be animated to float upward over time. In the version shown in screen 900, each dialog bubble can have an associated "absolute" timestamp indicating when the corresponding message was actually sent (e.g., date and time), in addition to the stream-relative timestamp displayed within the dialog bubble. In some embodiments, the absolute timestamps can be temporarily revealed, e.g., if the user performs a drag gesture (e.g., toward the left in image area 904), and hidden again when the drag is released. In some embodiments, the user can also scroll up and down within area 904 to view the entire conversation or any portion thereof. As with image area 204, the image associated with the currently playing content item (e.g., album artwork) can remain as a static background image, and the dialog bubbles can move over it as the user navigates within the conversation history or as new messages come in.

Screen 900 can also include message box 930, which can operate similarly to message box 530, allowing the user to begin composing a message to be sent to other users who are receiving the shared content stream. Control area 910 can provide information about the current track, and a user can obtain access to a full set of controls (e.g., control area 510 of FIG. 5) by tapping within area 910 or by dragging or swiping upward from area 910 or through some other input gesture. In some embodiments, restore control 912 at the top of screen 900 can be used to restore the view of control area 510. A gesture to restore the control area can result in message area 904 being reduced to the size of image area 204 (shown in FIG. 5) to create space for displaying control area 510. Dialog bubbles 906 can move up as area 904 shrinks, so that the dialog bubbles representing the most recent messages remain visible.

It will be appreciated that the user interface screens described herein are illustrative and that variations and modifications are possible. Screen elements can be rearranged as desired, and different combinations of control elements can be provided depending on the types of control operations that are supported in a particular implementation. Messages can be displayed using any arrangement or format desired, depending on available space and the nature of the content being streamed. For example, in some embodiments, messages can be displayed in a sidebar next to content-related images (e.g., where the streamed content includes video). A variety of different interface designs can be implemented to allow the user to send messages and view received messages associated with a shared content stream without leaving the context of the media app that is presenting the shared content stream. The messages themselves can also include any type of content (e.g., text, video, images, etc.).

In some embodiments, any content item (or set of related content items) that streaming media server 102 can stream to user devices can be shared using user interfaces similar to those shown. For example, streaming media server 102 can stream a single track, an album, a user-defined playlist, a curator-defined playlist, a radio station, or any other available content. Depending on implementation, streaming media server 102 may selectively limit or prohibit sharing of certain content streams (e.g., preventing streams containing explicit content from being shared to devices that have blocked explicit content).

Figure 10A:
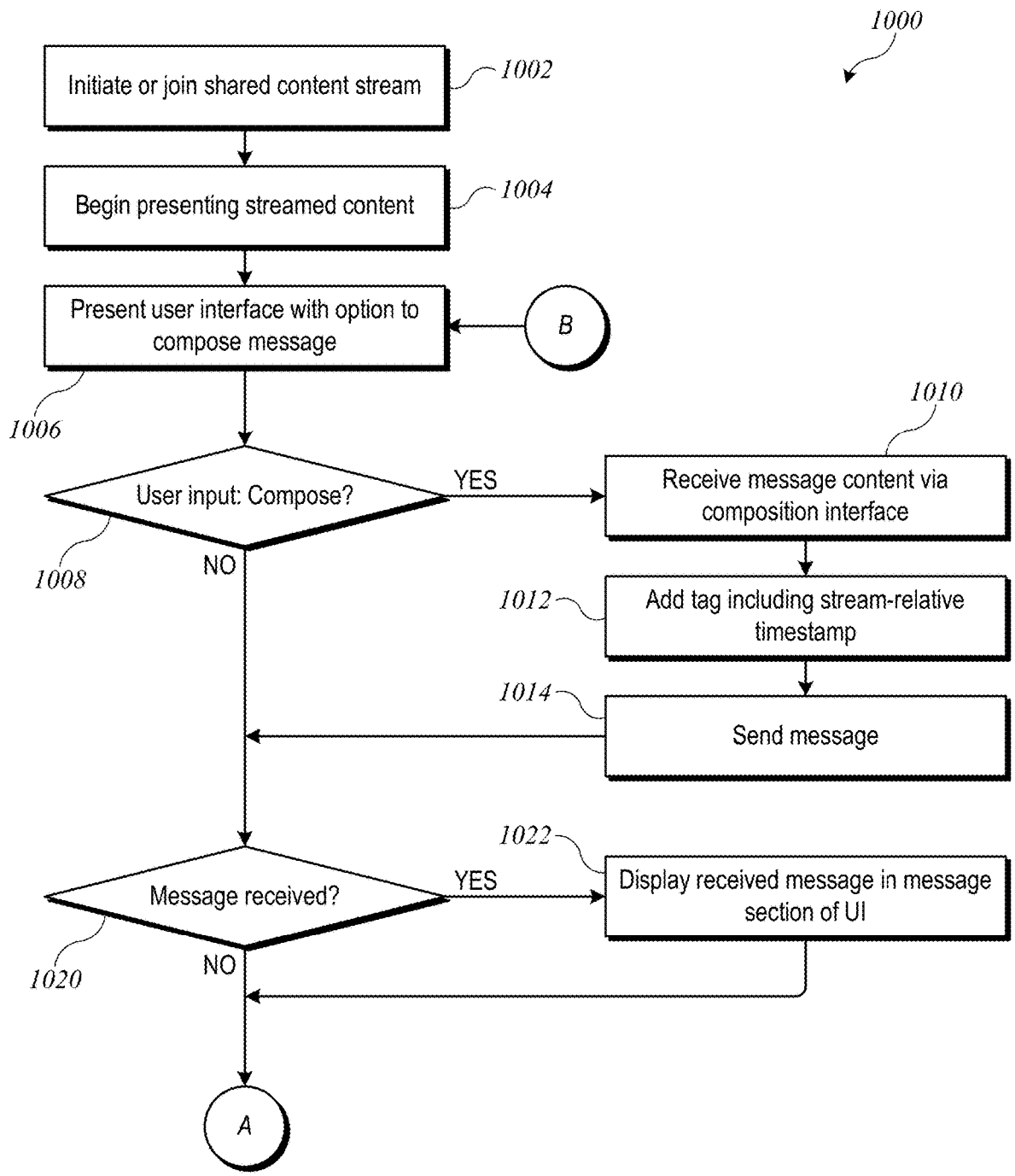
FIGS. 10A and 10B show a flow diagram of a process for sharing a content stream with integrated messaging capability according to an embodiment of the present disclosure.
Figure 10B:
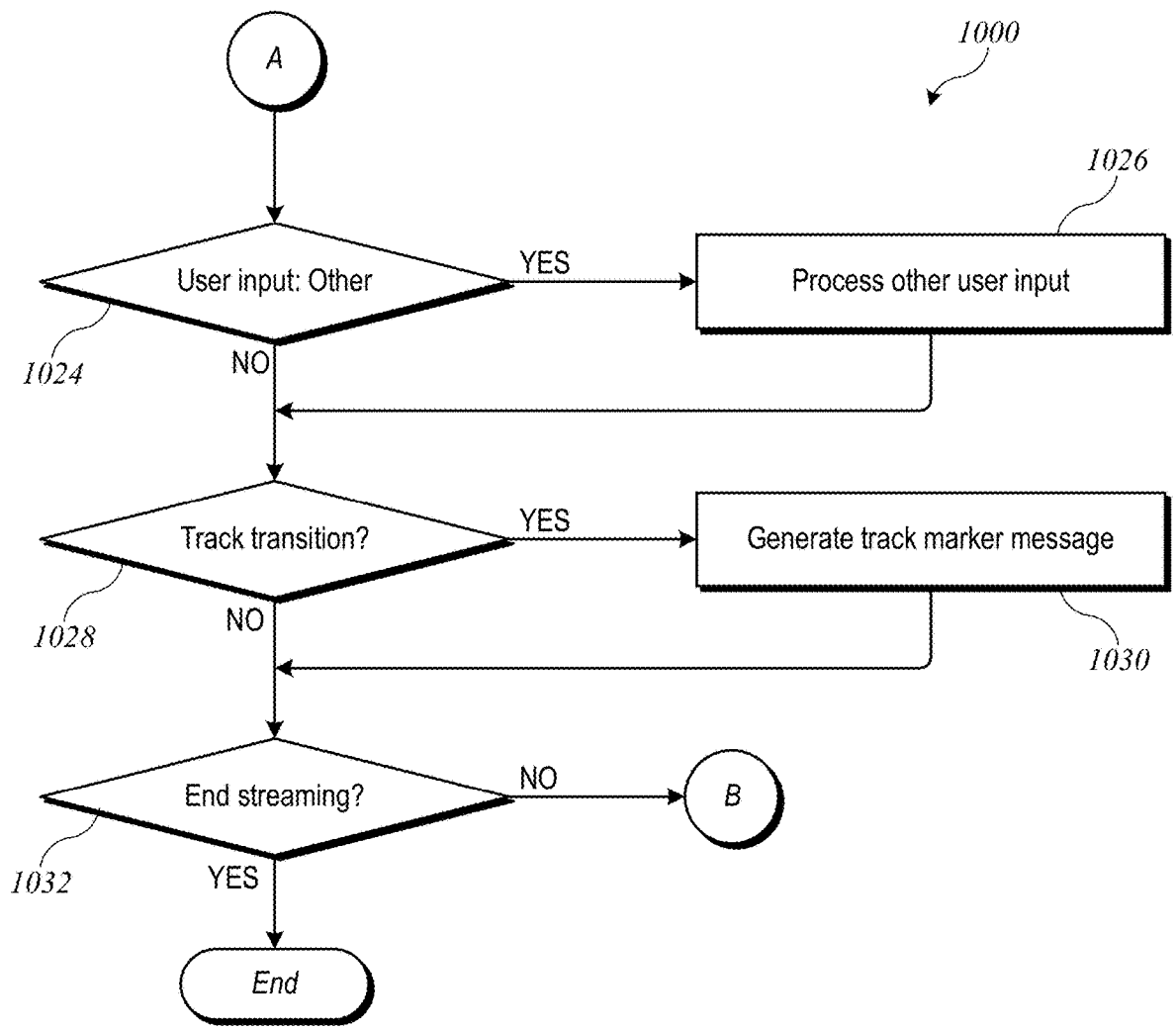

From the user's perspective, message exchange can appear to occur entirely within media app 120. However, media app 120 can, transparently to the user, leverage messaging functionality of messaging app 122 (which can be, e.g., running as a background process while media app 120 is in the foreground) to send and receive messages. FIGS. 10A and 10B show a flow diagram of a process 1000 for sharing a content stream with integrated messaging capability according to an embodiment of the present disclosure. Process 1000 can be executed by a user device, e.g., any user device 106 of FIG. 1, and can be implemented, e.g., within media app 120 communicating with messaging app 122.

Referring first to FIG. 10A, process 1000 can begin at block 1002 when user device 106 initiates or joins a shared content stream. For example, a shared content stream can be initiated in response to user interaction with screen 200 and menu 300 described above or in response to the user accepting an invitation, e.g., via overlay 400 described above. Any sequence of operations that results in user device 106 receiving a content stream that is also being streamed to one or more other user devices can be used, provided that user device 106 has user identifiers of the other users who are receiving the shared content stream. The user identifier can include, e.g., an email address, a phone number, any other address that can be used to send a message to the other user, or any other information usable by user device 106 to obtain an address that can be used to send a message to the other user.

At block 1004, user device 106 can begin presenting streamed content from the shared content stream. For example, user device 106 can receive streamed content from streaming media server 102 and present the content (e.g., play music). At block 1006, while presenting the streamed content, user device 106 can present a user interface with an option to compose a message to other users who are also receiving the shared content stream. For example, user device 106 can present now playing screen 500 of FIG. 5.

User device 106 can receive input via screen 500 and act on the received input. For example, at block 1008, user device 106 can determine whether the user has selected an input to compose a message (e.g., tapping on message box 530 of screen 500). If so, then at block 1010, user device 106 can present a composition interface (e.g., as shown in FIG. 6), and the user can compose the message. At block 1012, when the user indicates that the message is ready to send, user device 106 can add a tag to the message. The tag can include a stream-relative timestamp, such as an identifier of the stream (or a specific track within a multi-track stream) and a playback position within the stream or track (e.g., elapsed time since the beginning of playing the stream or track). At block 1014, user device 106 can send the message.

In some embodiments, the message can be sent through a channel separate from the channel used to stream the content. For example, messages can be sent using Short Messaging Service (SMS) technology, using a device-to-device communication service such as the iMessage® service of Apple Inc., or using other channels. Accordingly, streaming media server 102 (or other source of a content stream) need not provide any user-to-user messaging capability and need not receive or store any information about any messages that might be sent or received (including the fact of whether or when any messages were actually sent).

FIG. 11 shows an example of a stream-associated message 1100 according to an embodiment of the present disclosure. As shown, message 1100 can be represented using a structured data object with fields providing particular types of information. A device that receives the message can parse the data object and extract the information from various fields.

In the example shown, message 1100 includes a "To" field 1102 that can include addresses of one or more users to whom the message is directed and a "From" field 1104 that can include an address of the user who composed and sent the message. Depending on the particular message service or channel, each address can be, e.g., an email address of the recipient user, a phone number of a mobile phone of the recipient user, a user ID associated with a user-to-user messaging service, a user ID associated with streaming media service 102 (in embodiments where streaming media service 102 participates in routing of messages), or the like. In embodiments described herein, user device 106 can automatically populate "To" field 1102 with the addresses of all the other users who are sharing the content stream and "From" field 1104 with the address of the user of user device 106.

"Date" field 1106 can include an absolute timestamp for the message (e.g., date and time based on UTC or other standard for expressing absolute time).

"Body" field 1108 can include the message content provided by the user (e.g., using the composition interface of FIG. 6).

"Tag" field 1110 can include a stream-relative timestamp for message 1100. The stream-relative timestamp can include information related to the shared content stream. For example, the stream-relative timestamp can identify the shared content stream (e.g., a track, playlist, or album). If the stream includes multiple tracks, the stream-relative timestamp can identify the stream as a whole (e.g., an album or playlist) and the particular track within the stream. The stream-relative timestamp can also include a playback position within the stream or track (e.g., a time reference relative to the beginning of the track).

In some embodiments, message 1100 can be generated by media app 120 and provided as an outgoing message to messaging app 122, which can send the message (including the tag) as it would any other outgoing message. It is not required that messaging app 122 be able to read or parse tag 1110, although in some embodiments, messaging app 122 can have that capability.

Referring again to FIG. 10A, at block 1020, user device 106 can determine whether a message associated with the shared content stream was received. For example, messages can be received by messaging app 122 running in the background while media app 120 is running in the foreground. Any particular message received by messaging app 122 might or might not be associated with the shared content stream. (For instance, a user not participating in the shared content stream may send a message to one or more of the participants.) In some embodiments, messaging app 122 can parse each incoming message to determine whether it is associated with the shared content stream. For example, the determination can be based on any or all of: the presence and/or content of tag field 1110; whether the set of receiving and sending users for a received message matches the set of users participating in the shared content stream; and/or other information in the received message (e.g., tag information that expressly references media app 120). If messaging app 122 determines that the message is related to the shared content stream, messaging app 122 can route the message to media app 120, which can receive it at block 1020. In some embodiments, messaging app 122 can invoke a default alerting system separate from media app 120 (e.g., a notification pop-up) to alert the user to the arrival of a message not related to the shared content stream.

When media app 120 receives a message, at block 1022, media app 120 can display the received message, e.g., in a conversation view as shown in FIG. 7 or FIG. 9.

Referring now to FIG. 10B, process 1000 can continue (as indicated by node A). At block 1024, user device 106 can receive other user input. For example, the user may operate a control element in control area 510 of FIG. 5. At block 1026, the received user input can be processed; details of such inputs and processing thereof can be implementation-dependent and are not critical to understanding the messaging features disclosed herein.

At block 1028, a track transition can occur. For instance, if the stream includes an album, playlist, or any other collection of multiple content items (tracks), streaming media server 102 can include a track transition indicator in the content stream (e.g., with metadata providing information about the new track), and user device 106 can detect the track transition based on the indicator. When a track transition occurs, at block 1030, user device 106 can generate a track marker message. The track marker message can be similar to message 1100, except that the track marker message does not need to be sent to any other device, as each user device that is sharing the content stream can generate its own track marker. In some embodiments, media app 120 does not even need to provide the track marker message to messaging app 122. In other embodiments, media app 120 can provide the track marker message to messaging app 122, and messaging app 122 can add the track marker message to a conversation record associated with the set of users who are sharing the content stream. In such cases, the track marker message can be distinguished from other messages, e.g., by including a "track marker" indicator in Tag field 1110 or in Body field 1108, which can signal messaging app 122 not to send the track marker message. As with other messages generated by media app 120, "To" field 1102 and "From" field 1104 can be populated with addresses of the users who are sharing the content stream, which can help messaging app 122 to associate the track marker message with the conversation participants.

User device 106 can continue to stream the content, to receive and process user input (including sending messages) and to present received messages indefinitely; for instance, as indicated by node B, process 1000 can return to block 1006. At some point, at block 1032, a determination can be made that the streaming should end. For example, the user may stop the streaming, or all other user(s) may stop the streaming, in which case the stream is no longer shared. At that point, process 1000 can end.

It will be appreciated that process 1000 is illustrative and that variations and modifications are possible. Steps described as sequential may be executed in parallel, order of steps may be varied, and steps may be modified, combined, added or omitted. Messages can be sent and received in any sequence, and any number of users can participate in a single shared content stream. In some embodiments, a user may be able to select a subset of sharing users to receive a particular message, and the message would be sent only to the selected users. As another example, sending and receiving of messages in connection with a shared content stream may be limited to users who have accounts with a specific messaging service; users who do not have such accounts may be able to share the content stream but not to send or receive messages associated with it. In some instance a user may be receiving the shared content stream on a device that limits participation in message exchange. For example, a particular device (e.g., a TV with a set-top box) may be able to receive and present messages but may not provide an interface for composing and sending messages. Further, sharing of content streams can be limited to users who are subscribers of streaming media service 120.

In some embodiments, any user can join or leave a shared content stream at any time, and this need not disrupt the experience for other users. If a user joins or leaves a stream, the devices of the other sharing users can be notified, so that any new message can be routed to all users (and only those users) who are sharing the content stream at the time the new message is sent. In addition, the devices of the other sharing users may display notifications (e.g., within the message conversation view) indicating when users join or leave.

In some embodiments, a user can review messages associated with a shared content stream even after the streaming has ended. For example, as described above, media app 120 can use messaging app 122 to send and receive messages. Messaging app 122 can, as part of its normal operation, store a record of all sent and received messages, which can include messages associated with a shared content stream. Accordingly, a user can view these messages via messaging app 122.

Figure 12:
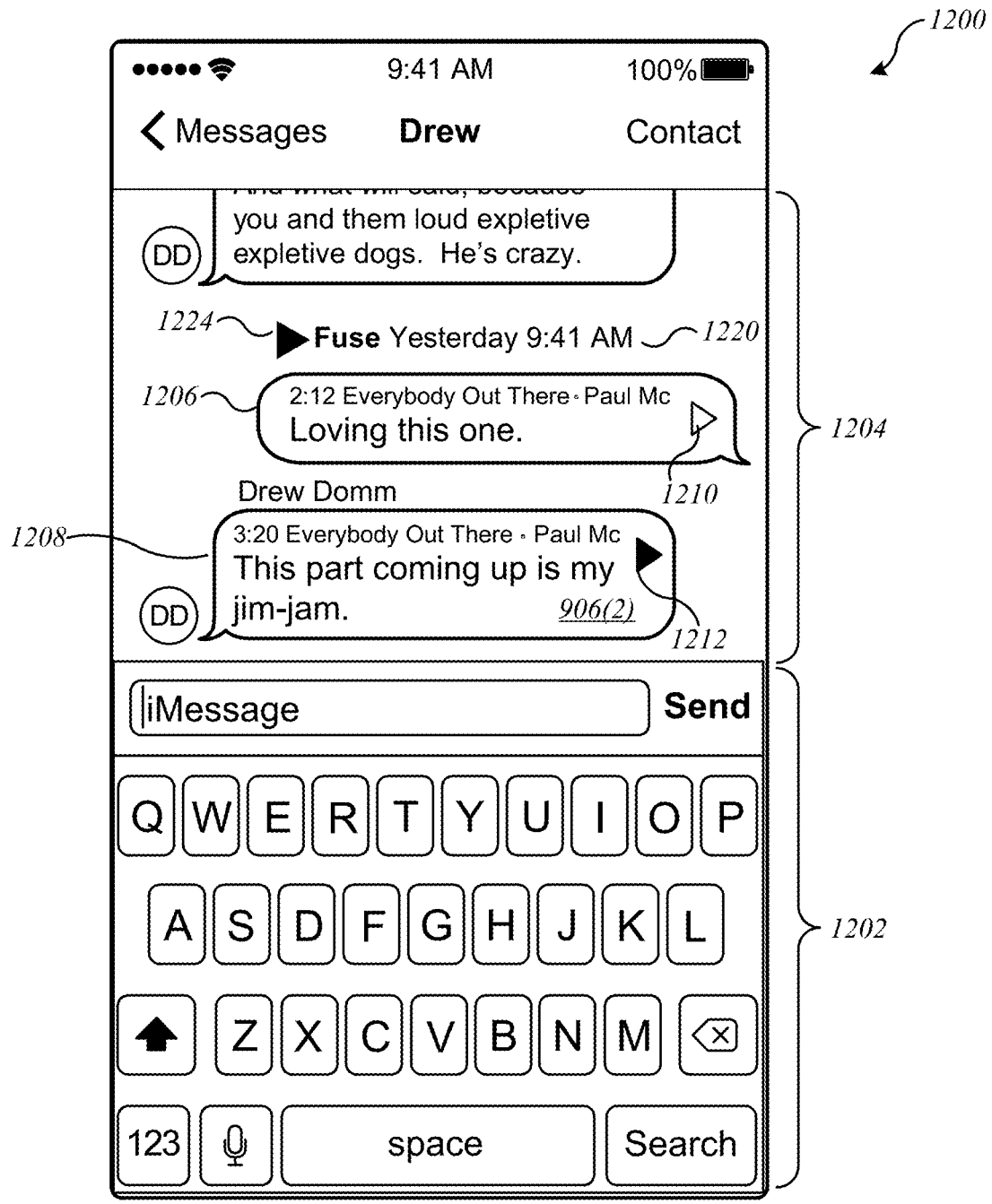
FIG. 12 shows a user interface screen presenting a conversation view in a messaging app according to an embodiment of the present disclosure.

For example, some messaging apps allow a user to view a conversation history that can include all messages exchanged with a particular individual or group. This conversation history can include messages that were exchanged in connection with a shared content stream. FIG. 12 shows a user interface screen 1200 presenting a conversation view in a messaging app according to an embodiment of the present disclosure. In this example, the conversation includes messages exchanged between the user of the device on which interface screen 1200 is displayed and another user (named Drew). Compose section 1202 can be operated to compose a message to Drew. History section 1204 can show messages previously sent to and received from Drew, in chronological order. Some (or all) of the messages can be messages that were associated with a shared content stream.

For example, dialog bubbles 1206, 1208 can represent messages that were sent in connection with a shared content stream. In this example, messaging app 122 can read Tag field 1110 of message 1100 and can add information to the display based on Tag field 1110. For instance, as shown, dialog bubbles 1206, 1208 can each include a stream-relative timestamp indicating that they were sent in association with a shared content stream and also indicating what content was playing when each message was sent. Dialog bubbles 1206, 1208 can each include a play control 1210, 1212. The user can operate play control 1210 or 1212 to replay a portion of the shared content stream on user device 106. For example, user device 106 can play the identified track starting at or near the track-relative time indicated, so that playback can start at different points depending on whether the user operates control 1210 or control 1212.

Conversation history section 1204 can also include track markers or session markers associated with the shared content stream, such as session marker 1220. Session marker 1220 can indicate when sharing of the content stream began. For example, media app 120 can generate a session marker message (similar to the track marker message described above) when a user initiates or joins a shared content stream, and messaging app 122 can store the session marker message as part of the conversation history, even if messaging app 122 did not actually send or receive the session marker message. In some embodiments, session marker 1220 can include a play control 1224 that the user can operate to initiate a replay of the entire shared content stream, including any messages associated therewith.

Figure 13:
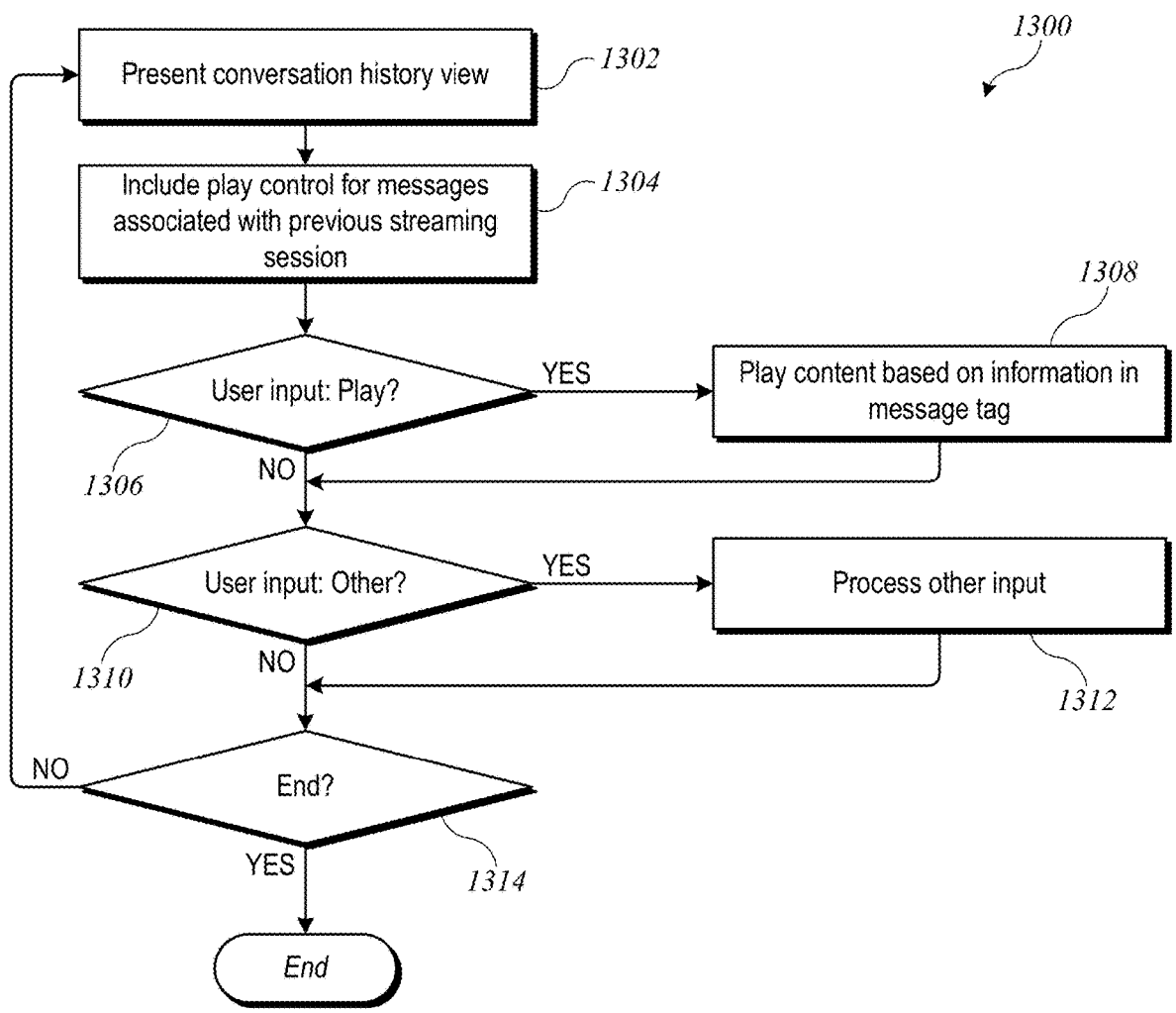
FIG. 13 shows a flow diagram of a process for reviewing messages associated with a shared content stream according to an embodiment of the present disclosure.

FIG. 13 shows a flow diagram of a process 1300 for reviewing messages associated with a shared content stream according to an embodiment of the present disclosure. Process 1300 can be executed by a user device, e.g., any user device 106 of FIG. 1, and can be implemented, e.g., within messaging app 122 communicating with media app 120.

At block 1302, user device 106 can present a conversation history view showing messages exchanged with a particular other user (or group of users), e.g., screen 1200 of FIG. 12. In some embodiments, messaging app 122 can implement conventional interfaces to allow the user to select a particular conversation history to view.

At block 1304, for any messages in the conversation history that are associated with a shared content stream (e.g., any messages that include Tag field 1110 described above), user device 104 can include a play control with the displayed message, e.g., as shown in FIG. 12. In some embodiments, this can include displaying a session marker or track marker with a play control, e.g., as shown in FIG. 12.

At block 1306, the user can select a displayed play control to request a replay of the stream (or a portion thereof). At block 1308, user device 106 can replay a portion of the streamed content, e.g., based on information in the tag field of the message for which the play control was selected.

For example, in response to user selection of play control 1210, messaging app 122 can generate a play request to media app 120. The play request can include at least the tag field of the message, which can identify a track and a playback position. Based on this information, media app 120 can stream the track (e.g., by communicating with streaming media server 102) or a portion thereof. For example, media app 120 can begin the playback five or ten seconds before the playback position indicated in the tag and can fade in the audio so that full volume is reached at the playback position indicated in the tag. Depending on implementation, media app 120 can play back a fixed-length segment of the track, e.g., the next 30 seconds after the playback position; continue playing until a playback position associated with the next message in the conversation; or continue playing to the end of the track. Further, in some embodiments, the user can select play control 1220 for a session marker to replay the entire shared content stream from the beginning, in which case media app 120 can begin playback with the first track that was shared. (The ability to replay an entire stream may depend on whether relevant history information is available to media app 120.)

In some embodiments, media app 120 can automatically come to the foreground in response to a play request from messaging app 122, so that screen 500 rather than screen 1200 is presented during playback. Where this is the case, media app 120 can present any messages associated with the shared content stream at times determined based on the tags (e.g., at the playback position indicated in the tag), thus allowing the user to replay the conversation as it occurred over time.

It should be understood that replaying a shared content stream (or portion thereof) can be done by one user device without sharing (or even attempting to share) the content stream again. In the replay, the user device can use its own stored messages to reproduce the conversation without requiring additional information from any other user device.

Assuming that messaging app 122 remains in the foreground, at block 1310, the user may provide other input unrelated to replaying a shared content stream, and at block 1312, messaging app 122 can process the input. For example, the user may compose a message, scroll up to view older messages in the conversation history, or navigate away from conversation history screen 1200. Interactions can continue until a determination to end process 1300 is made at block 1314.

It will be appreciated that interface screen 1200 and process 1300 are illustrative and that variations and modifications are possible. Process described as sequential may be executed in parallel, order of steps may be varied, and steps may be modified, combined, added or omitted. Formats used to display messages and associated interface controls (e.g., play controls) can be varied as desired. In some embodiments, a review of a previously shared content stream can be initiated from within media app 120. For example, media app 120 may store information identifying previously shared content streams and may present a stream-replay selection interface to the user based on the stored information. When the user selects a stream to replay, media app 120 can communicate with messaging app 122 to retrieve any stored messages that have tags associating them with the selected stream; thus, it is not necessary for media app 120 to retain its own store of messages. (In some embodiments, the user can also have the option to replay the stream without seeing the messages.)

Other variations and modifications will also be understood in light of the present disclosure. For example, some user devices may have a locked state, from which the user is required to enter a passcode or other access credential to unlock the full user interface and interact with the device. In some embodiments, a now playing screen can be presented on a "lock screen" that is displayed while the device is in a locked state. Where messages are exchanged as described above, the messages can also be displayed on the lock screen. In some embodiments, the user may enable privacy settings to prevent messages from being displayed while the device is in the locked state, and the message display process can respect the user's privacy settings, only displaying messages where the privacy settings indicate that messages should be displayed. Where messages are not displayed on the lock screen, the device can present notifications indicating that messages have been received and can present the message content in response to the user unlocking the device.

Messages can be sent and received in any format and can include any type of content desired. For example, some user devices and messaging protocols may allow the user to draw images that can be sent in messages and presented to the user; depending on the protocol, the drawing may be animated so that the recipient can watch the drawing being made. Some user devices and messaging protocols may allow the user to take and send a photo in a message, with or without accompanying text. Some user devices and messaging protocols may also support audio and/or video messages, where the sender can record a clip that the recipient can play. Any of these or other message types can be supported. In instances where the content being streamed and an associated message both include audio, the sender's device can use audio filtering techniques (e.g., echo cancellation) to reduce or remove any contribution of the streamed audio to the recorded message; the receiving device can fade the streamed audio while playing the message audio to make it easier to hear the audio of the message to be heard. In some embodiments, messaging can be based on services such as the FaceTime communication service of Apple Inc., and users may be able to watch each other experiencing the streamed content.

Further, while streaming audio is used as an example, messaging as described herein can be used in connection with streaming of any type of content to multiple users. Thus, for example, users may share a video stream and exchange messages to comment on the video as they watch; the comments can appear in a sidebar or inset or the like. Users may share a stream of an audio book and may pause the playing of the audio book to send a message without leaving the context of the audio book, or the users can just exchange messages while the audio book continues to play.

In still other embodiments, messages can be associated with a collaborative user activity that involves a two-way (or multi-way) data exchange. For example, two or more users may be collaboratively editing a document. For example, the document may be hosted on a server that receives change reports from one device and propagates them to others. Peer-to-peer collaboration technology may also be used. Such scenarios differ from "streaming," in part in that communication of content is two-way (or multi-way): changes made to the document by one user should be propagated to other users in approximately real time. Regardless of the particular technology or transmission path, it is assumed that changes made at one user device can be propagated to the others together with time stamps. Accordingly, messages sent between the users can be propagated with "collaboration-relative" time stamps derived from the timestamps of the changes. The messaging service in this context can provide a channel for user communication that is separate from the document, with the collaboration-relative time stamps providing a connection between specific messages and specific changes. A user interface can allow the user to see the document and the messages in one integrated view. In some embodiments, a user can replay the editing session, including the changes and comments, using techniques akin to those described above. For instance, a change log from the collaborative editing session can be time-correlated with the messages using the collaboration-relative timestamps.

Computer Implementation

Figure 14:
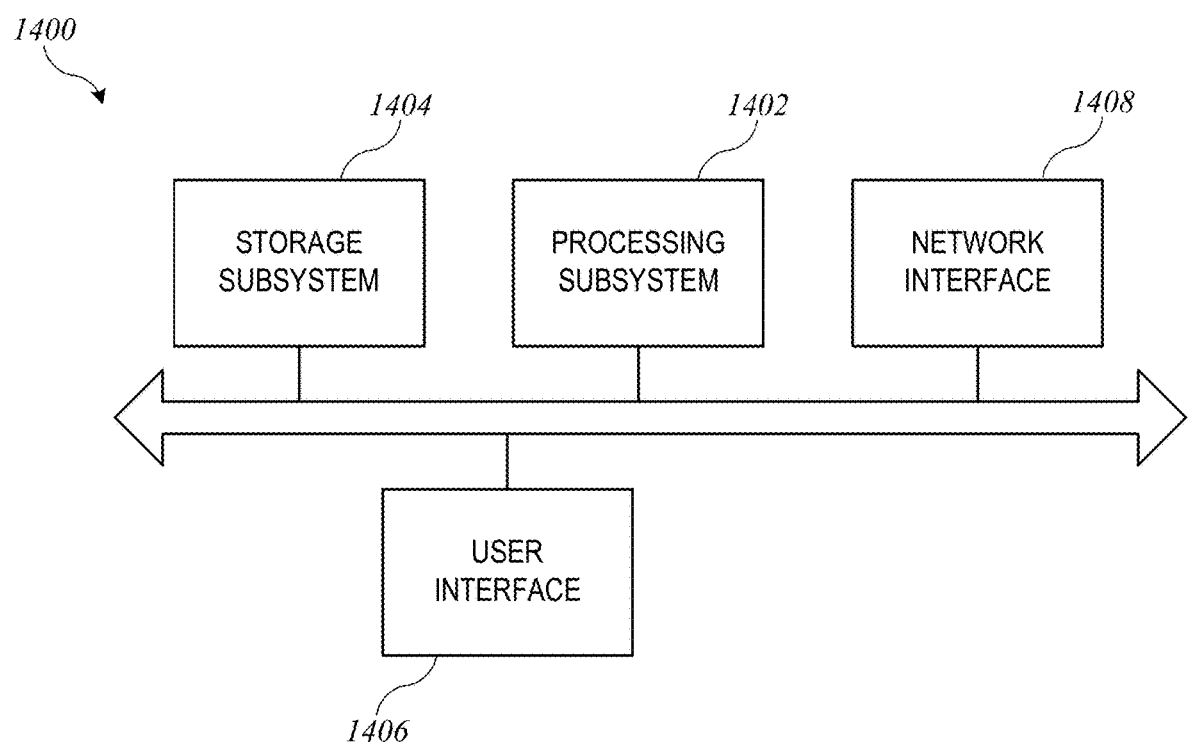
FIG. 14 shows a simplified block diagram of a computer system according to an embodiment of the present disclosure.

FIG. 14 shows a simplified block diagram of a computer system 1400 according to an embodiment of the present disclosure. In some embodiments, computer system 1400 can implement any or all of the functions, behaviors, and capabilities described herein as being performed by a user device (including user devices 106 of FIG. 1), as well as other functions, behaviors, and capabilities not expressly described. In some embodiments, another physical instance of computer system 1400 can implement any or all of the functions, behaviors, and capabilities described herein as being performed by a server (including streaming media server 102 of FIG. 1).

Computer system 1400 can include processing subsystem 1402, storage subsystem 1404, user interface 1406, and network interface 1408. Computer system 1400 can also include other components (not explicitly shown) such as a battery, power controllers, and other components operable to provide various enhanced capabilities. In some embodiments, computer system 1400 can be implemented in a consumer electronic device such as a desktop or laptop computer, tablet computer, smart phone, other mobile phone, wearable device, media device. household appliance, or the like. Computer system 1400 can also be implemented in a large-scale architecture such as a scalable server system or server farm that can include many interconnected processors, storage systems and interfaces, capable of processing and responding to high volumes of requests from client devices (including user devices).

Storage subsystem 1404 can be implemented, e.g., using disk, flash memory, or any other non-transitory storage medium, or a combination of media, and can include volatile and/or non-volatile storage media. In some embodiments, storage subsystem 1404 can store one or more application and/or operating system programs to be executed by processing subsystem 1402, including programs to implement any or all operations described herein as being performed by a user device. For example, storage subsystem 1404 can store media app 120 and messaging app 122 of FIG. 1 and associated data (e.g., a local media library). In instances where computer system 1400 implements a server, storage subsystem 1404 can be implemented using network storage technologies and/or other technologies that can manage high-volume requests to large data stores. For example, storage subsystem 1404 can store and manage catalog repository 110 and user account information repository 112. Depending on implementation, the various repositories can be physically or logically distinct.

User interface 1406 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). In some embodiments, a user can operate input devices of user interface 1406 to invoke the functionality of computer system 1400 and can view and/or hear output from computer system 1400 via output devices of user interface 1406. For example, all of the user interface screens described above can be rendered on a touchscreen display, and the user can provide input by touching appropriate areas of the touchscreen. Graphical user interfaces can also be rendered using a display screen and a pointing device (e.g., a mouse) that allows the user to control the position of an on-screen cursor; the user can position the cursor and press a button or tap a touch-sensitive surface to make a selection. In instances where computer system 1400 implements a server, user interface 1406 can be remotely located with respect to processing subsystem 1402 and/or storage subsystem 1404.

Processing subsystem 1402 can be implemented using one or more integrated circuits, e.g., one or more single-core or multi-core microprocessors or microcontrollers, examples of which are known in the art. In operation, processing subsystem 1402 can control the operation of computer system 1400. In various embodiments, processing subsystem 1402 can execute a variety of programs in response to program code and can maintain multiple concurrently executing programs or processes. At any given time, some or all of the program code to be executed can be resident in processing subsystem 1402 and/or in storage media such as storage subsystem 1404.

Through suitable programming, processing subsystem 1402 can provide various functionality for computer system 1400. For example, where computer system 1400 implements user device 106, processing subsystem 1402 can implement various processes (or portions thereof) described above as being implemented by a user device. Processing subsystem 1402 can also execute other programs to control other functions of computer system 1400, including programs that may be stored in storage subsystem 1404. Where computer system 1400 implements streaming media server 102, processing subsystem 1402 can implement operations including streaming of content, generating page data for rendering various pages, performing searches within catalog repository 110, and so on.

Network communication interface 1408 can provide voice and/or data communication capability for computer system 1400. In some embodiments, network communication interface 1408 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 1408 can provide wired network connectivity (e.g., Ethernet) in addition to or instead of a wireless interface. Network communication interface 1408 can be implemented using a combination of hardware (e.g., driver circuits, antennas, modulators/demodulators, encoders/decoders, and other analog and/or digital signal processing circuits) and software components. In some embodiments, network communication interface 1408 can support multiple communication channels concurrently, using the same transport or different transports.

It will be appreciated that computer system 1400 is illustrative and that variations and modifications are possible. User devices implemented using computer system 1400 can be portable or non-portable as desired, and any number of user devices can communicate with a streaming media server. User devices and/or streaming media servers can have functionality not described herein (e.g., a user device may provide voice communication via cellular telephone networks; control mechanisms and/or interfaces for operating an appliance such as a thermostat or door lock; ability to interact with the user to provide personal information, play games, access content via the wireless network and/or locally stored content; etc.), and implementations of these devices and servers can include components appropriate to such functionality.

Further, while a computer system is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. For instance, many of the examples in the foregoing description refer to streaming of music. It is to be understood that message exchanges can also be used in connection with other types of streaming media services, such as services that provide access to movies, TV programs, games or other apps, books, and any other form of media content, and/or with interactive content services such as collaborative document editing. In some embodiments, any user (or any subscriber to a particular streaming service) can initiate sharing of a content stream with one or more other users. Sharing can be initiated at any time, e.g., before or while streaming content. User devices can join in response to an invitation (e.g., from the initiating use or from other users if permitted by a given implementation) at any time. Some embodiments may allow user devices to discover and request to join an in-progress stream with another user; the initiating user's device can be notified and can determine whether to grant the request. While a content stream is being shared, additional users can be invited at any time (by the initiating user or by other users, depending on implementation) and/or users can "drop off" the shared stream by disconnecting their own devices from the stream; a user that drops off can be invited to rejoin. In some embodiments, the sharing of the stream among other users need not end just because one user drops off, although some implementations may provide that a shared stream ends if the initiating user drops off Control over the stream can be restricted to the initiating user or shared among multiple users as desired. In some embodiments, the initiating user may be able to hand off control to another user, and this may allow the initiating user to drop out without ending the stream for other devices that are still sharing. Thus, a given stream can be shared or unshared at any time.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method comprising:
   receiving, at a user device, a shared content stream that is shared with one or more other user devices;
   presenting, by the user device, the shared content stream to a user at the user device; and
   while presenting the shared content stream:
      presenting, by the user device, a user interface that includes information from the shared content stream, a message control operable by the user to compose and send a message to other users of the one or more other devices, and a content control operable by the user to interact with the shared content stream, wherein the interaction with the shared content stream by the user at the user device is reflected in the shared content stream shared with the one or more other user devices;
      receiving, via the user interface, user input including a new message to be sent;
      presenting, by the user interface, an image corresponding to the shared content stream and previous messages including the message and the new message, the message traverses along a first non-linear path overlaid upon the image and the new message traverses along a second non-linear path overlaid upon the image;
      receiving an incoming message from one of the other users of the one or more other devices; and
      presenting content of the incoming message such that the incoming message traverses along a third non-linear path overlaid upon the image; and
   at a time after presentation of the shared content stream has ceased, presenting, in a second user interface for a messaging application, a conversation view that includes at least a subset of messages sent and received during the presentation of the shared content stream, wherein each message of the subset is presented as traversing along different non-linear paths overlaid upon the image.

2. The method of claim 1, wherein the first non-linear path is curved.

3. The method of claim 1, wherein the first non-linear path includes an upward movement or a rightward movement.

4. The method of claim 1, wherein the first non-linear path is selected when the message is sent or received while a first portion of the shared content stream is being played, and the second non-linear path is selected when the new message is sent while a second portion of the shared content stream is being played.

5. The method of claim 1, wherein the content control includes a control operable to pause and resume playing of the shared content stream.

6. The method of claim 1, wherein the content control includes a control operable to invite another user to share the shared content stream.

7. The method of claim 1, wherein the display of previous messages is animated such that a representation of a new message is initially presented at a first side of the third portion and moves along a non-linear path across the third portion toward a second side opposite the first side.

8. The method of claim 1, wherein the message control includes a text box and wherein a virtual keyboard is presented in the first portion in response to user input selecting the text box.

9. The method of claim 1, wherein the previous messages are represented as bubbles moving in an upward direction.

10. The method of claim 1, wherein the previous messages correspond to a messaging conversation between the user and one or more users of the one or more other user devices.

11. The method of claim 10, wherein the messaging conversation was identified during playback of the shared content stream.

12. The method of claim 1, wherein each one of the previous messages comprises at least one of text, a video, audio, or an image.

13. A non-transitory computer-readable storage medium having stored thereon program instructions that, when executed by a processor in a device, cause the device to perform a method comprising:
   receiving, at the device, a shared content stream that is shared with one or more other devices;
   presenting, by the device, the shared content stream on a display of the device; and
   while presenting the shared content stream:
      presenting, by the device, a user interface that includes information from the shared content stream, a message control operable to compose and send a message to the other devices, and a content control operable to interact with the shared content stream, wherein the interaction with the shared content stream at the device is reflected in the shared content stream shared with the other devices;
      receiving, via the user interface, user input including a new message to be sent;
      presenting, by the user interface, an image corresponding to the shared content stream and previous messages including the message and the new message, the message traverses along a first non-linear path overlaid upon the image and the new message traverses along a second non-linear path overlaid upon the image;
      receiving an incoming message from one of the other devices; and presenting content of the incoming message such that the incoming message traverses along a third non-linear path overlaid upon the image; and at a time after presentation of the shared content stream has ceased, presenting, in a second user interface for a messaging application, a conversation view that includes at least a subset of messages sent and received during the presentation of the shared content stream, wherein each message of the subset is presented as traversing along different non-linear paths overlaid upon the image.

14. The non-transitory computer-readable storage medium of claim 13, wherein the first non-linear path is curved.

15. The non-transitory computer-readable storage medium of claim 13, wherein the first non-linear path includes an upward movement or a rightward movement.

16. The non-transitory computer-readable storage medium of claim 13, wherein the first non-linear path is selected when the message is sent or received while a first portion of the shared content stream is being played, and the second non-linear path is selected when the new message is sent while a second portion of the shared content stream is being played.

17. A device comprising:
a display;
one or more processors; and
a non-transitory memory having stored thereon computer-readable instructions that, when executed by the one or more processors, cause the device to:
receive, at the device, a shared content stream that is shared with one or more other devices;
presenting the shared content stream on the display; and
while presenting the shared content stream:
present, on the display, a user interface that includes information from the shared content stream, a message control operable to compose and send a message to the other devices, and a content control operable to interact with the shared content stream, wherein the interaction with the shared content stream at the device is reflected in the shared content stream shared with the other devices;
receive, via the user interface, user input including a new message to be sent;
present, by the user interface, an image corresponding to the shared content stream and previous messages including the message and the new message, the message traverses along a first non-linear path overlaid upon the image and the new message traverses along a second non-linear path overlaid upon the image;
receive an incoming message from one of the other devices; and
present content of the incoming message such that the incoming message traverses along a third non-linear path overlaid upon the image; and
at a time after presentation of the shared content stream has ceased, present, in a second user interface for a messaging application, a conversation view that includes at least a subset of messages sent and received during the presentation of the shared content stream, wherein each message of the subset is presented as traversing along different non- linear paths overlaid upon the image.

18. The device of claim 17, wherein the first non-linear path is curved.

19. The device of claim 17, wherein the first non-linear path includes an upward movement or a rightward movement.

20. The device of claim 17, wherein the first non-linear path is selected when the message is sent or received while a first portion of the shared content stream is being played, and the second non-linear path is selected when the new message is sent while a second portion of the shared content stream is being played.

\* \* \* \* \*